(12) United States Patent
Xu et al.

(10) Patent No.: US 11,283,495 B2
(45) Date of Patent: Mar. 22, 2022

(54) METHODS FOR BEAM TRACKING AND METHODS FOR GENERATING A CODEBOOK

(71) Applicant: Beijing University of Posts and Telecommunications, Beijing (CN)

(72) Inventors: Wenjun Xu, Beijing (CN); Jinglin Zhang, Beijing (CN); Hui Gao, Beijing (CN); Zhiyong Feng, Beijing (CN); Zhi Zhang, Beijing (CN); Jiaru Lin, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 0 days.

(21) Appl. No.: 17/393,068

(22) Filed: Aug. 3, 2021

(65) Prior Publication Data

US 2021/0367644 A1 Nov. 25, 2021

Related U.S. Application Data

(63) Continuation of application No. PCT/CN2021/078995, filed on Mar. 4, 2021.

(30) Foreign Application Priority Data

Apr. 7, 2020 (CN) .......................... 202010264146.2

(51) Int. Cl.
*H04B 7/0426* (2017.01)
*H04B 7/0456* (2017.01)
(Continued)

(52) U.S. Cl.
CPC ........... *H04B 7/043* (2013.01); *H04B 7/0456* (2013.01); *H04B 7/0617* (2013.01); *H04W 4/027* (2013.01); *H04W 4/40* (2018.02)

(58) Field of Classification Search
CPC .... H04B 7/043; H04B 7/0456; H04B 7/0617; H04B 7/06; H04B 7/08; H04W 4/027; H04W 4/40
See application file for complete search history.

(56) References Cited

U.S. PATENT DOCUMENTS

| | | | |
|---|---|---|---|
| 10,594,383 B1* | 3/2020 | Orhan | H04B 7/0456 |
| 2018/0115065 A1* | 4/2018 | Valdes Garcia | H01Q 3/267 |
| 2020/0119785 A1* | 4/2020 | Varatharaajan | H04B 7/0478 |

* cited by examiner

*Primary Examiner* — Vineeta S Panwalkar
(74) *Attorney, Agent, or Firm* — Westbridge IP LLC

(57) ABSTRACT

Disclosed are methods for beam tracking. In the methods, a transmitting unmanned aerial vehicle (UAV) receives motion state information (MSI) of a receiving UAV and determines a first beam angle from the transmitting UAV to the receiving UAV according to the MSI of the receiving UAV. Then the transmitting UAV selects a codeword from a codebook according to the first beam angle. Finally, the transmitting UAV determines an activated sub-array and a beam-forming vector of the CCA according to the size of the activated sub-array corresponding to the sub-codebook to which the codeword belongs, a second beam angle corresponding to the codeword and a location of a central antenna element of an activated sub-array corresponding to the codeword and transmits information using the beam-forming vector. One or more examples of the present disclosure also provide a method for beam tracking implemented by the receiving UAV, methods for generating a codebook.

19 Claims, 8 Drawing Sheets

(51) Int. Cl.
*H04B 7/06* (2006.01)
*H04W 4/02* (2018.01)
*H04W 4/40* (2018.01)

METHODS FOR BEAM TRACKING AND METHODS FOR GENERATING A CODEBOOK

CROSS-REFERENCE TO RELATED APPLICATIONS

The present application is a continuation of PCT application PCT/CN2021/078995 entitled "Method for Beam Tracking, Method for Generating a Codebook, Device and Storage Medium Thereof", filed on Mar. 4, 2021, which claims priority of Chinese patent application 202010264146.2, filed on Apr. 7, 2020, the entire contents of which are incorporated herein by reference.

TECHNICAL FIELD

The present disclosure relates to unmanned aerial vehicles (UAVs), and more particularly, to methods for beam tracking and methods for generating a codebook applied to a UAV enabled by a cylindrical conformal array (CCA) with directional radiating elements (DRE).

BACKGROUND

A conformal antenna array, such as a CCA, is an antenna array which can be attached to and conform to a surface of a carrier, such as a UAV. Using a conformal antenna array conforming to the surface of a UAV can make full use of the shape of the UAV itself to achieve a full-space beam coverage without destroying aerodynamic characteristics of the UAV. Therefore, additional resistances and energy costs of an antenna array can be avoided.

A DRE is an antenna whose radiation range is within a certain angular range. Because of its universality on shape, the DRE-covered CCA can conform to various shapes of surfaces of carriers, such as UAVs, while maintaining good beam patterns.

Millimeter-wave beam tracking is a technique for maintaining millimeter-wave communication links. The millimeter-wave communication often adopts narrow beams to compensate high path losses of millimeter-wave propagations, and obtains a corresponding analog beam forming vector through a beam tracking technology. In this way, alignments of millimeter-wave beams can be obtained. Further, performances of millimeter-wave communication can be improved by making full use of gains of an antenna array. Further, in a beam tracking technique, a beam-forming vector can be efficiently obtained by designing a codebook and selecting a corresponding codeword from the codebook.

Therefore, in a millimeter-wave communication system of UAVs, in which the UAVs are enabled by DRE-covered CCAs, how to design a codebook according to characteristics of the CCAs and how to obtain a beam-forming vector according to the codebook so as to track the beam efficiently becomes key problems to be solved.

SUMMARY

In view of the above, some examples of the present disclosure provide a method for beam tracking that enables an efficient tracking of millimeter-wave beams among UAVs enabled by DRE-covered CCAs.

A method for beam tracking implemented by a transmitting UAV provided by one or more examples of the present disclosure may include: receiving motion state information (MSI) of a receiving UAV fed back by the receiving UAV; determining a first beam angle from the transmitting UAV to the receiving UAV according to the MSI of the receiving UAV; selecting a codeword from a codebook according to the first beam angle; wherein, a size of a maximum activated sub-array corresponding to the codebook is determined according to parameters of a CCA adopted by the transmitting UAV; the codebook includes at least two sub-codebooks; a number of sub-codebooks of the codebook is determined according to the size of the maximum activated sub-array; each of the sub-codebooks corresponds to a size of an activated sub-array; the size of the activated sub-array is determined according to the size of the maximum activated sub-array; each of the sub-codebooks includes at least two codewords; each codeword corresponds to a beam angle and a location of a central antenna element of the activated sub-array; determining an activated sub-array and a beam-forming vector of the CCA according to the size of the activated sub-array corresponding to the sub-codebook to which the codeword belongs, a second beam angle corresponding to the codeword and a location of a central antenna element of an activated sub-array corresponding to the codeword; and transmitting information using the beam-forming vector.

Another method for beam tracking implemented by a receiving UAV provided by one or more examples of the present disclosure may include: receiving MSI of a $k^{th}$ transmitting UAV fed back by the $k^{th}$ transmitting UAV; determining a third beam angle from the receiving UAV to the $k^{th}$ transmitting UAV according to the MSI of the $k^{th}$ transmitting UAV; selecting a codeword of the $k^{th}$ transmitting UAV from a codebook according to the third beam angle; wherein, a size of a maximum activated sub-array corresponding to the codebook is determined according to parameters of a CCA adopted by the receiving UAV; the codebook includes at least two sub-codebooks; a number of sub-codebooks of the codebook is determined according to the size of the maximum activated sub-array; each of the sub-codebooks corresponds to a size of an activated sub-array; the size of the activated sub-array is determined according to the size of the maximum activated sub-array; each of the sub-codebooks includes at least two codewords; each codeword corresponds to a beam angle and a location of a central antenna element of the activated sub-array; calculating a conflict matrix between the codeword of the $k^{th}$ transmitting UAV and codewords of other transmitting UAVs; in response to determining the conflict matrix is a non-zero matrix, calculating a conflict set corresponding to the codeword of the $k^{th}$ transmitting UAV; wherein, the conflict set includes a set of transmitting UAVs; codewords of the set of transmitting UAVs are conflict with the codeword of the $k^{th}$ transmitting UAV; adding the $k^{th}$ transmitting UAV into the conflict set; updating the codewords of the transmitting UAVs in the conflict set; determining an activated sub-array and a combining vector of the CCA according to a size of an activated sub-array corresponding to a sub-codebook to which an updated codeword of the $k^{th}$ transmitting UAV belongs, a fourth beam angle corresponding to the updated codeword of the $k^{th}$ transmitting UAV; and receiving information using the combining vector; in response to determining the conflict matrix is a zero matrix, receiving information using the combining vector.

A method for generating a codebook applied to a CCA provided by one or more examples of the present disclosure may include: obtaining parameters of the CCA; determining a size of a maximum activated sub-array corresponding to the codebook according to the parameters of the CCA; determining a number of sub-codebooks contained in the codebook and a size of an activated sub-array corresponding to each sub-codebook according to the size of the maximum activated sub-array corresponding to the codebook; and generating codewords contained in each sub-codebook according to the size of the activated sub-array corresponding to the sub-codebook and the parameters of the CCA; wherein, each codeword corresponds to a beam angle and a location of a central antenna element of the activated sub-array.

It can be seen that the methods for beam tracking provided by one or more examples of the present disclosure applies a new codebook which contains both a beam-forming pattern and a sub-array activation pattern. Further, the new codebook is applicable to a DRE-covered CCA. Moreover, in the methods for beam tracking based on the new codebook, a transmitting UAV or a receiving UAV can select an appropriate codeword in the new codebook according to MSI of its opposite UAV. Further, an activated sub-array and a beam-forming vector or a combining vector can be determined according to the codeword selected. In this way, the efficiency of millimeter-wave communications between UAVs can be improved.

Compared with other beam tracking schemes, the proposed method can be applied to DRE-covered CCAs effectively. Therefore, a full-range beam coverage can be achieved, and the spectrum efficiency of millimeter-wave communications in case of fast-moving UAVs can also be improved.

BRIEF DESCRIPTION OF DRAWINGS

To describe technical solutions in the present disclosure or the related arts clearly, drawings used in the description of the examples will be briefly described below. Obviously, the drawings in the description below are just examples of the present disclosure. Those of ordinary skill in the art can also obtain other drawings based on these drawings without the exercise of inventive faculty.

DETAILED DESCRIPTION OF THE EMBODIMENTS

In order to make the purposes, technical solutions and advantages of the present disclosure clearer, the present disclosure is further elaborated with reference to the specific examples and the drawings in the following paragraphs.

It should be noted that, unless otherwise specified, the technical terms or scientific terms used in the examples of the present disclosure shall be understood in a usual sense by those of ordinary skill in the art. "First", "second" and the like used in the examples of the present disclosure do not indicate any order, number or importance, but are merely used to distinguish different constituent parts. "Comprises", "comprising" or other similar words imply that an element or object appearing before "comprises" or "comprising" covers enumerated elements or objects and equivalent elements thereof appearing after "comprises" or "comprising"; however, other elements or objects are not excluded. "Connection", "interconnection" and the like are not limited to physical or mechanical connection, but may include electrical connection, whether direct or indirect. "Up", "down", "left", "right" and the like are merely used to indicate a relative location relation, and when an absolute location of an object to be described changes, the relative location relation changes accordingly.

Figure 1:
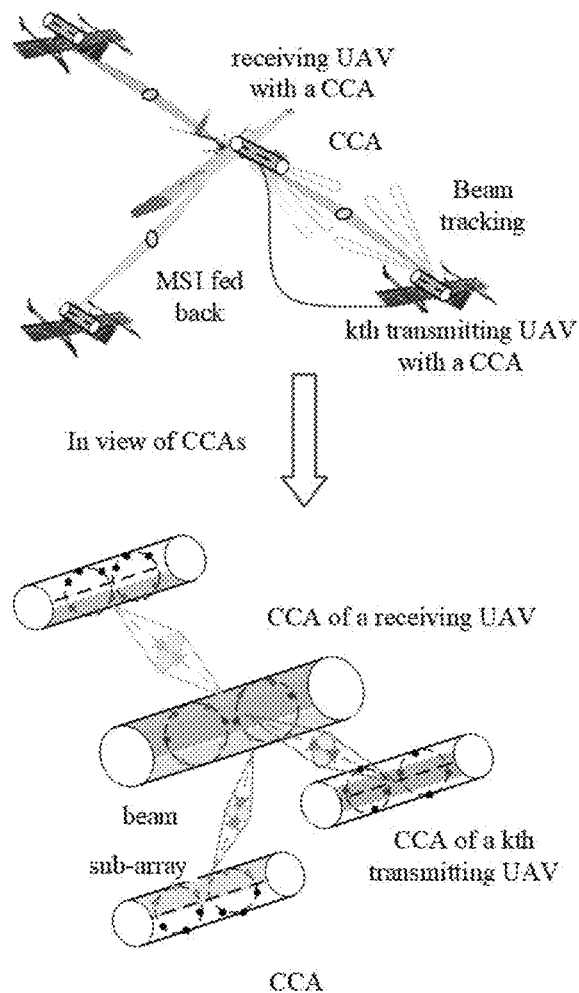
FIG. 1 is a schematic diagram illustrating a scenario of a DRE-covered CCA enabled-UAV millimeter-wave network according to one or more examples of the present disclosure.

As described previously, the DRE-covered CCA can be conformed to various shapes of surfaces of carriers, such as UAVs, while maintaining good beam patterns due to its universality on shapes. FIG. 1 illustrates a scenario of a DRE-covered CCA enabled-UAV millimeter-wave network according to one or more examples of the present disclosure. Hereinafter, in examples of the present disclosure, a CCA may refer to a DRE-covered CCA.

As shown in FIG. 1, through the beam tracking technology provided by the present disclosure, both transmitting UAVs and receiving UAVs can obtain corresponding beam-forming vectors, so that millimeter-wave beam alignment can be maintained, and gains of antenna arrays can be fully used to improve a communication rate of the highly dynamic UAV millimeter-wave network.

Figure 2A:
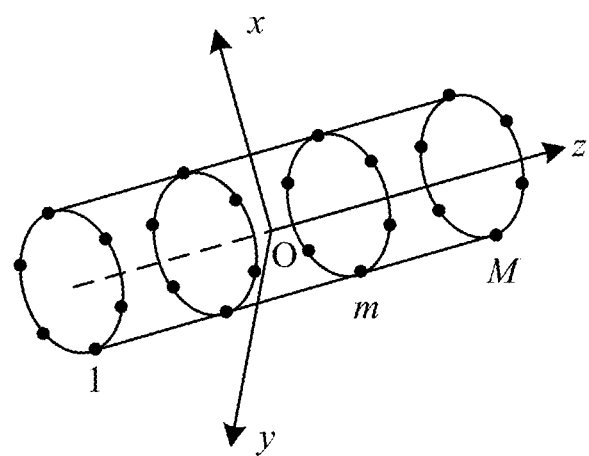
FIG. 2a and FIG. 2b are schematic diagrams illustrating a structure of a CCA according to one or more examples of the present disclosure.
Figure 2B:
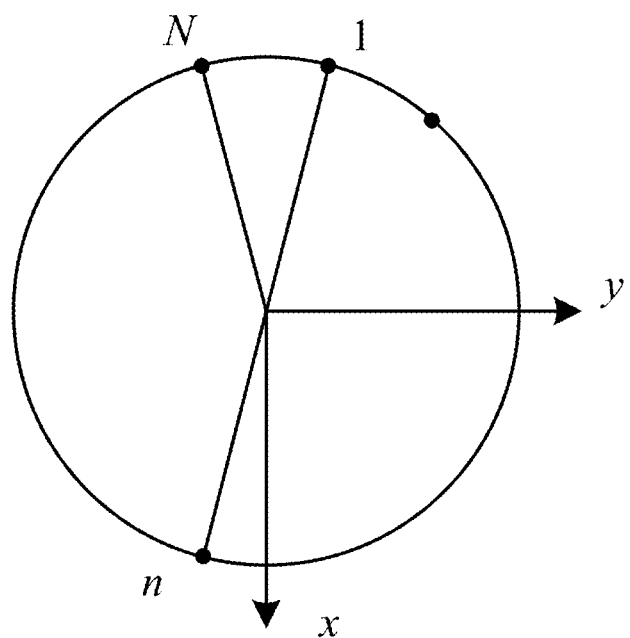

FIG. 2a and FIG. 2b are schematic diagrams illustrating a structure of a CCA according to one or more examples of the present disclosure. In these figures, FIG. 2a shows a three-dimensional structure of a CCA according to an example of the present disclosure. The coordinate system illustrated in FIG. 2a may be referred to as a CCA coordinate system. FIG. 2b shows an example of a set of antenna elements in an xy-plane (in a circle antenna array) of a CCA according to an example of the present disclosure.

In an example of the present disclosure, the size of the antenna array of the CCA shown in FIG. 2a may be indicated as M×N. Wherein, N represents the number of antenna elements of the CCA in an xy-plane (in a circle antenna array); M represents the number of antenna elements contained in the CCA on the z-axis. The radius of the cylinder of the CCA may be denoted as $R_{cyl}$. The angular interval between the antenna elements in an xy-plane (in a circle antenna array) can be indicated as $$\Delta\phi_c = \frac{2\pi}{N}.$$

The location of antenna element n can be expressed as $$\phi_n = \phi_c(n) = \frac{(2n-1-N)\Delta\phi_c}{2}.$$

The distance between two adjacent antenna elements in an xy-plane (in a circle antenna array) can be indicated as $$d_{xy} = \frac{\lambda_c}{2},$$

wherein, $\lambda_c$ denotes a wavelength of a carrier. The distance between two adjacent antenna elements on the z-axis should be indicated as $$d_{cyl} = \frac{\lambda_c}{2}.$$

In some examples of the present disclosure, the antenna element in a CCA may adopt a DRE. The radiation range of a DRE in an azimuth plane may be set as $[\alpha_{n,min}, \alpha_{n,max}]$. The radiation range of the DRE in an elevation plane may be set as $[\beta_{m,min}, \beta_{m,max}]$. Accordingly, the radiation width of the DRE in the azimuth plane may be represented as $\Delta\alpha = \alpha_{n,max} - \alpha_{n,min}$. Further, the radiation width of the DRE in the elevation plane may be represented as $\Delta\beta = \beta_{m,max} - \beta_{m,min}$. It should be noted that when the radiation range of a DRE covers an entire angular domain, the DRE then degenerates into a normal antenna element.

Based on the above information, as shown in FIG. 2b, in the CCA coordinate system, the radiation range of an $n^{th}$ DRE in the azimuth plane can be expressed as:

$$\alpha_{n,min} = \phi_n - \frac{\Delta\alpha}{2} + 2l\pi, l \in Z$$

$$\alpha_{n,max} = \phi_n + \frac{\Delta\alpha}{2} + 2l\pi, l \in Z$$

The radiation range of an $m^{th}$ DRE in the elevation plane can be expressed as:

$$\beta_{m,min} = -\frac{\Delta\beta}{2} + 2l\pi, l \in Z$$

$$\beta_{n,max} = \frac{\Delta\beta}{2} + 2l\pi, l \in Z$$

Wherein, Z represents a set of integers; l represents an integer.

For a CCA applied to a UAV is typically large in size, $\Delta\phi_c$ is often small. Therefore, the arrangement of the antenna array of a CCA should satisfy the following conditions $\Delta\phi_c < \Delta\alpha$ and $\Delta\beta = \pi$ to ensure that the CCA can cover an entire angular domain.

In case that the beam angles of a CCA (including an azimuth angle on the azimuth plane and an elevation angle on the elevation plane) are determined, some antenna elements in the CCA may not be working. That is, a part of DREs with the determined beam angles exceed their coverage should not be activated. In this case, while conducting a communication, the CCA may need to avoid activating these unworking DREs to prevent the efficiency reduction. That is to say, to perform a beam tracking of a CCA-enabled UAV millimeter-wave network, a sub-array of antennas to be activated in the CCA should be determined first. Hereinafter, the sub-array of antennas to be activated in the CCA may be referred to as an activated sub-array for short. Then, a beam-forming vector corresponding to the activated sub-array would be determined.

Figure 3:
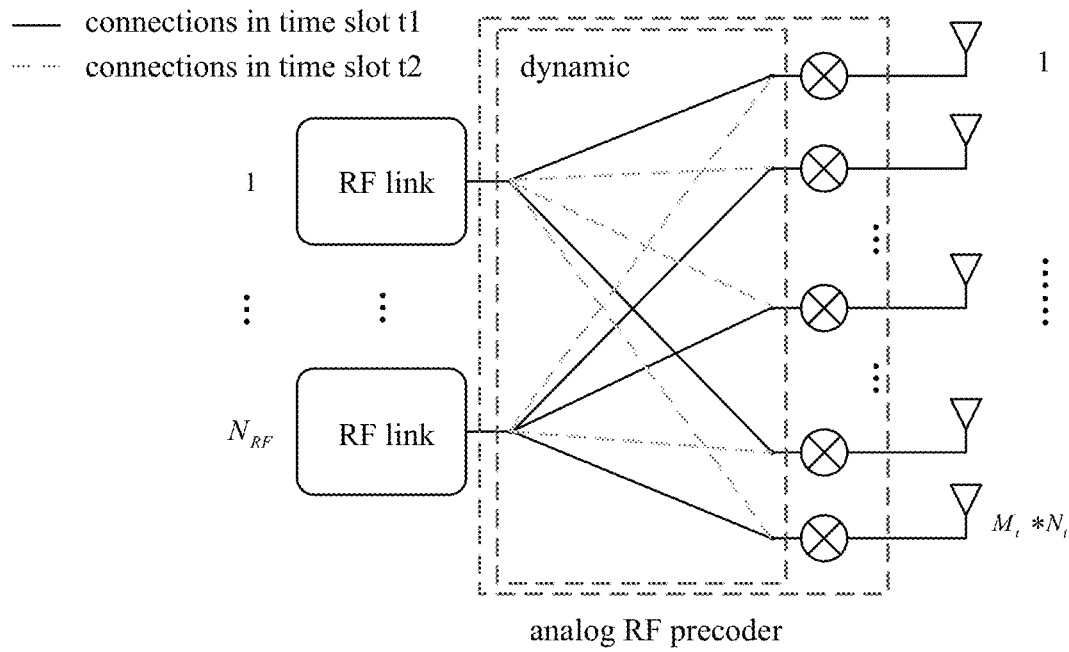
FIG. 3 is a schematic diagram illustrating a structure of an analog radio frequency (RF) precoder with a dynamic activated sub-array according to one or more examples of the present disclosure.

In examples of the present disclosure, based on the structure of the CCA described above, a UAV may employ an analog radio frequency (RF) precoder structure with a dynamic activated sub-array for analog beam-forming. FIG. 3 shows an analog RF precoder architecture with a dynamic activated sub-array according to an example of the present disclosure. As shown in FIG. 3, the precoder may include $N_{RF}$ RF links and the number of transmitting antennas can be set as $M_t \times N_t$. The precoder shown in FIG. 3 may adjust connections between the RF links and the antenna elements according to changes on channels in different time slots to form an activated sub-array dynamically.

In a certain time slot, the precoder would be with a certain structure in which only partial elements are connected. That is to say, in a certain time slot, the RF links will be connected to a part of the antenna elements. In this way, only the antenna elements connected to the RF links will be activated, which form an activated sub-array of the CCA at this certain time slot.

In examples of the present disclosure, an activated sub-array described may be determined by two parameters: a size of the activated sub-array and a location of a central antenna element of the activated sub-array. That is, an activated sub-array would be determined once the size of the activated sub-array and the location of the central antenna element of the activated sub-array are determined.

As described above, determining a beam-forming vector by designing a codebook and selecting a corresponding codeword from the codebook according to the MSI of an opposite UAV is an efficient way to obtain a beam-forming vector. Therefore, examples of the present disclosure may provide a codebook which contains both a beam-forming pattern and a sub-array activation pattern. Moreover, this codebook is suitable for a CCA.

In examples of the present disclosure, the beam-forming pattern may refer to a beam-forming vector, which determines the beam angle and the beam width. The sub-array activation pattern may refer to an activated sub-array, i.e. the size of the activated sub-array and the location of the central antenna element of the activated sub-array. That is, an activated sub-array and a beam-forming vector of activated sub-array in a CCA can both be determined based on the codeword selected.

According to examples of the present disclosure, the codebook containing both the beam-forming pattern and the sub-array activation pattern can be a three-dimensional codebook which can be used for beam tracking of a CCA-enabled UAV millimeter-wave network. In particular, the three-dimensional codebook can be a hierarchical codebook, which can cover a three-dimensional full space and can express an activated sub-array and its corresponding beam-forming vector for beam tracking via the codeword selection.

A structure of the codebook according to examples of the present disclosure will be described in detail with reference to the accompanying drawings.

Figure 4:
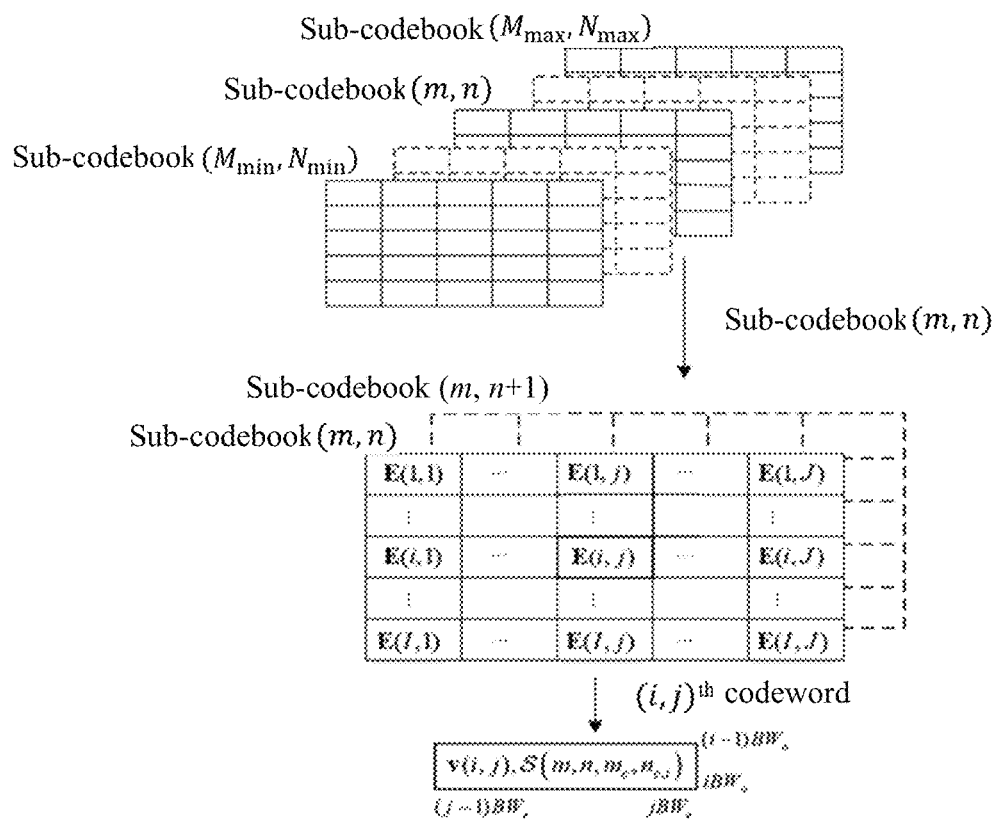
FIG. 4 is a schematic diagram illustrating a structure of a codebook according to one or more examples of the present disclosure.

FIG. 4 shows a structure of the codebook proposed by an example of the present disclosure. As shown in FIG. 4, the codebook has multiple layers or sub-codebooks, including: Sub-codebook ($M_{min}$, $N_{min}$), . . . , Sub-codebook (m, n), . . . , and Sub-codebook ($M_{max}$, $N_{max}$). The codebook may correspond to a size of a maximum activated sub-array. In an example of the present disclosure, the size of the maximum activated sub-array corresponding to the codebook may be determined according to parameters of the CCA adopted by the UAV. Those would understand that the size of the maximum activated sub-array also dictates a maximum resolution of the codebook.

Furthermore, the number of sub-codebooks of the codebook can also be determined according to the size of the maximum activated sub-array. Further, a sub-codebook may have a determined resolution. For example, Sub-codebook (m, n) may have a determined beam width $BW_a$ in the azimuth plane and a determined beam width $BW_e$ in the elevation plane. The resolution of a sub-codebook can be determined according to the size of its corresponding activated sub-array m×n. That is, each sub-codebook in the codebook may correspond to a size of an activated sub-array, and the size of the activated sub-array corresponding to a sub-codebook can be determined according to the size of the maximum activated sub-array corresponding to the codebook. For example, the size of the activated sub-array corresponding to Sub-codebook ($M_{min}$, $N_{min}$) may be $M_{min}$×$N_{min}$; . . . ; the size of the activated sub-array corresponding to Sub-codebook (m, n) may be m×n; . . . ; and the size of the activated sub-array corresponding to Sub-codebook ($M_{max}$, $N_{max}$) may be $M_{max}$×$N_{max}$. In an example of the present disclosure, the size of the activated sub-array corresponding to each sub-codebook should be smaller than the size of the maximum activated sub-array corresponding to the codebook.

For example, if the size of the activated sub-array of the CCA is m×n, the CCA-enabled transmitting UAV and the receiving UAV can select an optimal codeword from the Sub-codebook (m, n) of the codebook shown in FIG. 4.

In addition, as shown in FIG. 4, each sub-codebook in the codebook may include I×J codewords. The number of codewords contained in each sub-codebook can be determined by the beam width $BW_a$ in the azimuth plane and the beam width $BW_e$ in the elevation plane. Wherein, the $(i, j)^{th}$ codeword of the codewords may correspond to a quantized beam angle ($\alpha_i$, $\beta_j$). The quantized beam angle ($\alpha_i$, $\beta_j$) may include a quantized azimuth angle $\alpha_i$ and a quantized elevation angle $\beta_j$. Wherein, i represents the sequence number of the azimuth angle corresponding to the codeword; j represents the sequence number of the elevation angle corresponding to the codeword.

In addition, the size of the activated sub-array corresponding to each codeword can also be determined according to the sub-codebook in which the codeword belongs. Thus, the following two aspects of information can be obtained according to a codeword in the above codebook: the beam-forming pattern and the sub-array activation pattern. In particular, the beam-forming pattern may be determined by the quantized beam angle ($\alpha_i$, $\beta_j$), i.e. the azimuth angle $\alpha_i$ and the elevation angle $\beta_j$ contained in the codeword, and the beam width related to the sub-codebook in which the codeword belongs. The sub-array activation pattern may be determined by the sub-codebook in which the codeword belongs and the quantized azimuth angle $\alpha_i$.

Design of the codebook will now be described in detail with reference to the drawings and specific examples.

As stated above, the beam-forming pattern, namely, an antenna weight vector or a beam-forming vector v(m, n, i, j, S) of the CCA can be determined according to the $(i, j)^{th}$ codeword in Sub-codebook (m, n). Wherein, S(m, n, $p_c(i)$) can be used to determine the activated sub-array. $p_c(i)=(m_c, n_c)$ represents the location of the central antenna element of the activated sub-array. $p_c(i)$ can be determined according to the size of the antenna array used by the CCA and the given azimuth angle. (m, n) indicates the size of the activated sub-array. Thus, the activated sub-array used in beam-forming can be determined according to S(m, n, $p_c(i)$).

In some examples of the present disclosure, the location of the central antenna element of the activated sub-array may be determined by the following expressions.

$$n_c = \left\lceil \frac{\alpha + 2l\pi}{\Delta\phi_c} + \frac{(N+1)}{2} \right\rceil, l \in Z$$

$$m_c = \left\lfloor \frac{M}{2} \right\rfloor, l \in Z$$

Wherein, M and N refer to dimensions of an antenna array of the CCA. $\Delta\phi_c$ represents an angular interval between antenna elements of the CCA in an xy-plane (in a circle). $\alpha$ represents a given azimuth angle. l represents an integer.

In this case, a coverage of the codeword in the azimuth plane can be denoted as [(i−1) $BW_a$, i$BW_a$] and a coverage of the codeword in the elevation plane can be denoted as [(j−1)$BW_e$, j$BW_e$].

In this case, the maximum resolution (the maximum number of layers or the size of the maximum activated sub-array corresponding to the codebook) $M_{max}$×$N_{min}$ of the codebook should satisfy a limitation that $M_{max}$=M. That is, the maximum resolution on the z-axis should equal to the number of antenna elements on the z-axis. Further, the maximum resolution $M_{max}$×$N_{max}$ of the codebook should also satisfy the following limitation.

$$N_{max} = \left\| \left\lceil \frac{\alpha_0 + 2l\pi + \Delta\alpha/2}{\Delta\phi_c} + \frac{(N+1)}{2} \right\rceil - \left\lceil \frac{\alpha_0 + 2l\pi - \Delta\alpha/2}{\Delta\phi_c} + \frac{(N+1)}{2} \right\rceil \right\|$$

Wherein, $\alpha_0$ denotes a given azimuth angle.

It can be seen that the size of the maximum activated sub-array corresponding to the codebook can be determined according to the parameters of the CCA.

In examples of the present disclosure, the beam-forming vector determined by the $(i, j)^{th}$ codeword in Sub-codebook (m, n) of the codebook may be expressed element by element as the following expression (1).

$$[v(m,n,i,j,S)]_{(m_v,n_v)} = 1_{\{m_v,n_v,i,j\}}[A(\alpha_i,\beta_j)]_{(m_v,n_v)} \qquad (1)$$

Wherein, ($m_v$, $n_v$) represents the indication number of the element of the codeword, and $[v(m, n, i, j, S)]_{(m_v,n_v)}$ is the ($m_v$, $n_v$)-th element of the $(i, j)^{th}$ codeword in Sub-codebook (m, n) v(m, n, i, j, S), $1_{\{m,n,i,j\}}$ represents an indication function, which can be specifically expressed as the following expression.

$$1_{\{m,n,i,j\}} = \begin{cases} 1, & (m, n) \in S(m, n, p_c(i)) \\ 0, & \text{else} \end{cases}$$

$[A(\alpha_i, \beta_j)]_{(m_v, n_v)}$ is the $(m_v, n_v)$-th element of $A(\alpha, \beta)$, and $A(\alpha, \beta)$ represents a steering vector, which can be specifically expressed as the following expression.

$$A(\alpha, \beta) = \left[ e^{j\frac{2\pi}{\lambda_c}\left(R_{cy1}\cos\frac{(1-N)\Delta\phi_c}{2}\cos\beta + R_{cy1}\sin\frac{(1-N)\Delta\phi_c}{2}\sin\alpha\sin\beta + \frac{(1-M)d_{cy1}}{2}\cos\alpha_i\sin\beta\right)}, \right.$$

$$\ldots ,$$

$$e^{j\frac{2\pi}{\lambda_c}\left(R_{cy1}\cos\phi_c(n)\cos\beta + R_{cy1}\sin\phi_c(n)\sin\alpha\sin\beta + \frac{(M+1-3m)d_{cy1}}{2}\cos\alpha\sin\beta\right)},$$

$$\ldots ,$$

$$\left. e^{j\frac{2\pi}{\lambda_c}\left(R_{cy1}\cos\frac{(N-1)\Delta\phi_c}{2}\cos\beta + R_{cy1}\sin\frac{(N-1)\Delta\phi_c}{2}\sin\alpha\sin\beta + \frac{(M-1)d_{cy1}}{2}\cos\alpha\sin\beta\right)} \right]^T,$$

Wherein, $(\alpha_i, \beta_j)$ represents an azimuth angle and an elevation angle respectively corresponding to the codeword.

It can be seen from the above indication function that when the corresponding sub-array belongs to the activated sub-array S, the indication function is 1, otherwise, the indication function is 0. Thus, locations of non-zero elements in a codeword reflect the location of the activated sub-array, i.e., each codeword may correspond to a location of an activation sub-array.

Specifically, how to determine the azimuth angle and the elevation angle corresponding to each codeword in the codebook will be described below.

In this example, $(\alpha_i, \beta_j)$ is used to express a pair of an azimuth angle and an elevation angle corresponding to a codeword. Wherein, $$\alpha_i = \frac{iBW_a}{2}, i \in \left[1, \left\lceil \frac{2\pi}{BW_a} \right\rceil\right], \beta_j = \frac{jBW_e}{2}, j \in \left[1, \left\lceil \frac{\pi}{BW_e} \right\rceil\right].$$

Wherein, $BW_a$ reflects a beam width in the azimuth plane corresponding to a codeword; while $BW_e$ reflects a beam width in the elevation plane corresponding to the codeword.

Further, $BW_{a(e)} = \min\{BW_{a(e),array}, BW_{a(e),element}\}$. Wherein, $$BW_{a,array} = \frac{2\pi}{N}, BW_{e,array} = \frac{2\pi}{M},$$

$BW_{a,element} = \Delta\alpha + (N-1)\Delta\emptyset_c + 2/\pi$, $1 \in Z$, and $BW_{e,element} = \Delta\beta$.

It can be seen that the codebook can achieve coverage in the full space and have different resolutions (beam widths), and can give a sub-array activation pattern and a corresponding beam-forming vector which can avoid activating unworking antenna elements.

Based on the codebook mentioned above, a transmitting UAV or a receiving UAV can select a corresponding codeword therefrom so as to determine an activated sub-array and a beam-forming vector of the activated sub-array so as to realize beam tracking.

Figure 5:
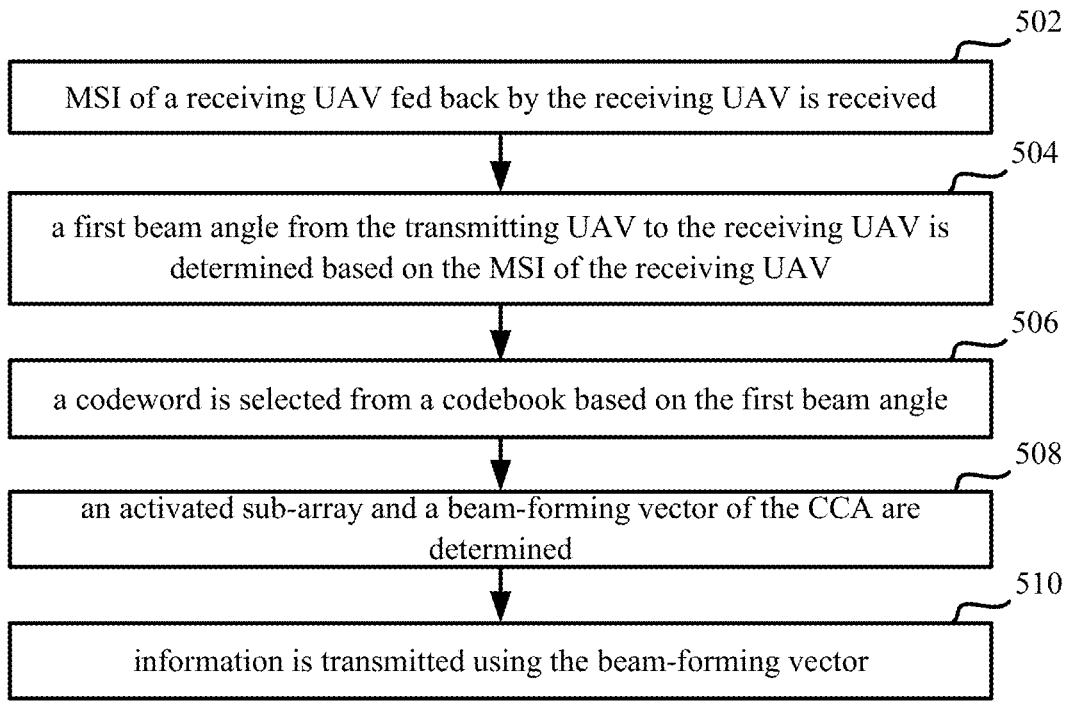
FIG. 5 is a flow chart illustrating a method for beam tracking applied to a transmitting UAV according to one or more examples of the present disclosure.

FIG. 5 shows a method for beam tracking by a transmitting UAV according to an example of the present disclosure. As shown in FIG. 5, the transmitting UAV may perform the following steps to achieve beam tracking.

In block 502, MSI of a receiving UAV fed back by the receiving UAV is received.

In some examples of the present disclosure, the UAV may be regarded as a rigid body in space. In this case, the MSI of a UAV may comprise location information and attitude information about the UAV. Wherein, the location information may be represented by a three-dimensional coordinate of the UAV in space. The attitude information may include an elevation angle, a rotation angle and a yaw angle, namely, angles formed by rotations of the UAV around the x, y and z axes in space respectively.

In examples of the present disclosure, the MSI described above may also be used to predict the MSI in future time slots of the receiving UAV.

In an example of the present disclosure, a transmitting UAV can receive the MSI of the receiving UAV via a low-frequency auxiliary frequency band.

In block 504, a first beam angle from the transmitting UAV to the receiving UAV is determined based on the MSI of the receiving UAV.

In examples of the present disclosure, a first beam angle from a transmitting UAV to a receiving UAV may be determined based on the location information and the attitude information of the receiving UAV. Specifically, a first beam angle from a transmitting UAV to a receiving UAV can be obtained by using a geometric relationship between the transmitting UAV and the receiving UAV through location information and attitude information of the receiving UAV. The first beam angle from a first UAV to a second UAV is an angle from the first UAV with respect to an origin point in a coordinate system taking the second UAV as the origin point. In the present example, taking the transmitting UAV as the origin point, the first beam angle $(\alpha, \beta)$ is the angle from the receiving UAV with respect to the transmitting UAV (the origin point), which includes an azimuth angle $\alpha$ and an elevation angle $\beta$. The first beam angle then can be used as an angle on which a codeword is selected.

In block 506, a codeword is selected from a codebook based on the first beam angle.

In some examples of the present disclosure, the codebook may include at least two sub-codebooks. The size of the maximum activated sub-array corresponding to the codebook can be determined according to parameters of the CCA adopted by the transmitting UAV. The number of sub-codebooks of the codebook can be determined according to the size of the maximum activated sub-array. Each of the sub-codebooks may correspond to the size of an activated sub-array. And the size of the activated sub-array can be determined according to the size of the maximum activated sub-array. Each of the sub-codebooks may include at least two codewords. Wherein, each codeword may correspond to a beam angle including an azimuth angle and an elevation angle. Each codeword may also correspond to a location of a central antenna element of the activated sub-array.

Specific methods for the transmitting UAV to select a codeword will be described in detail later.

In block 508, an activated sub-array and a beam-forming vector of the CCA are determined according to the size of the activated sub-array corresponding to the sub-codebook to which the codeword belongs, a second beam angle corresponding to the codeword selected and a location of a central antenna element of the activated sub-array corresponding to the codeword selected.

In examples of the present disclosure, the transmitting UAV may determine the size of the activated sub-array and the location of the central antenna element of the activated sub-array in the process of codeword selection. Then, in this block, the transmitting UAV may determine the activated sub-array of its own CCA according to the size of the activated sub-array and the location of the central antenna element of the activated sub-array.

Next, in examples of the present disclosure, the transmitting UAV may determine a steering vector based on the azimuth angle and the elevation angle of the second beam angle corresponding to the codeword selected. Then the transmitting UAV may determine a beam-forming vector based on the activated sub-array and the steering vector. Specifically, the transmitting UAV can determine the beam-forming vector according to the above-mentioned expression (1).

In block 510, information is transmitted using the beam-forming vector.

In examples of the present disclosure, after determining the beam-forming vector, the transmitting UAV may perform a beam-forming using the beam-forming vector determined and then perform an information transmission.

A method for selecting a codeword from the pre-set codebook according to the MSI of the receiving UAV will be described in detail with reference to specific examples.

Figure 6:
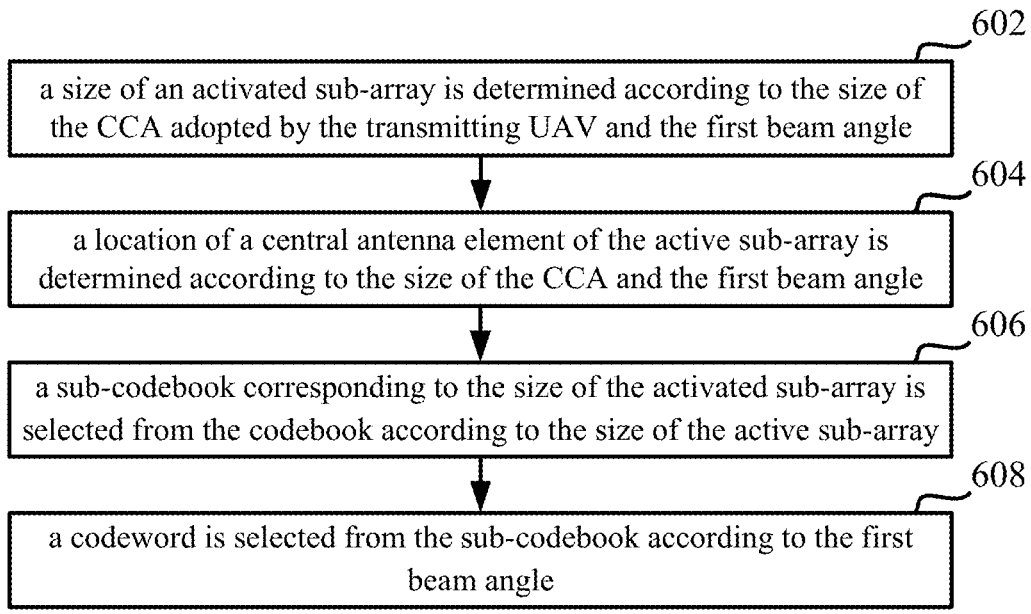
FIG. 6 is a flow chart illustrating a method for selecting a codeword from a pre-set codebook by a transmitting UAV based on MSI of a receiving UAV according to one or more examples of the present disclosure.

FIG. 6 is a flow chart of a method for selecting a codeword from the codebook according to MSI of a receiving UAV according to an example of the present disclosure. As shown in FIG. 6, the method may specifically include the following steps.

In block 602, a size of an activated sub-array is determined according to the size of the CCA adopted by the transmitting UAV and the first beam angle.

In some examples of the present disclosure, the transmitting UAV may determine the size of the activated sub-array based on the size of the CCA adopted by itself and the first beam angle. Wherein, the size of the activated sub-array may be equal to a maximum resolution calculated from the size of the CCA and the first beam angle.

Specifically, assume that the size of CCA adopted by the transmitting UAV is M×N. Wherein, M represents the number of antenna arrays on the z axis of the CCA. N represents the number of antenna elements of the CCA in an xy-plane (in a circle antenna array). The first beam angle may be denoted as $(\alpha_0, \beta_0)$, wherein, $\alpha_0$ represents a determined azimuth angle; $\beta_0$ represents a determined elevation angle.

In this example, the maximum resolution may be determined as $M_{max} \times N_{max}$ based on the size of the CCA and the first beam angle. Thereby, the size of the activated sub-array may be determined as $M_{max} \times N_{max}$.

In particular, in examples of the present disclosure, the maximum resolution on the z-axis $M_{max}$ may be made equal to the number of antenna elements on the z-axis. That is, $M_{max}=M$. Further, the maximum resolution in the xy-plane (a circle antenna array) $N_{max}$ can be determined via the following expressions.

$$N_{max} = \left| \left\lceil \frac{\alpha_0 + 2l\pi + \Delta\alpha/2}{\Delta\phi_c} + \frac{(N+1)}{2} \right\rceil - \left\lceil \frac{\alpha_0 + 2l\pi - \Delta\alpha/2}{\Delta\phi_c} + \frac{(N+1)}{2} \right\rceil \right|$$

Wherein, $\Delta\phi_e$ represents an angular interval between antenna elements of the CCA in the xy-plane (in a circle antenna array). l represents an integer. $\Delta\alpha$ represents a radiation width of the DRE in the azimuth plane. $\alpha_0$ denotes a given azimuth angle.

In block 604, a location of a central antenna element of the activated sub-array is determined according to the size of the CCA and the first beam angle.

In examples of the present disclosure, the location of the central antenna element $(m_c, n_c)$ of the activated sub-array may be determined by the following expressions.

$$m_c = \left\lfloor \frac{M}{2} \right\rfloor$$

$$n_c = \left\lceil \frac{\alpha_0 + 2l\pi}{\Delta\phi_c} + \frac{(N+1)}{2} \right\rceil$$

In addition to the optimal codeword selection scheme based on the maximum resolution (minimum beamwidth) described above, sub-array activation patterns and beam-forming vectors of different resolutions may be obtained by selecting different sizes of the activated sub-arrays.

For example, depending on an actual computing power of the UAV, the time required to search for codewords may be reduced by selecting a smaller resolution (a smaller size of the activated sub-array), thereby achieving a tradeoff between communication rate and latency.

In other examples, when a prediction error exists, the transmitted beam may deviate from the actual direction towards the receiving end. In this case, the narrower the beam width is, the more difficult it is to achieve beam alignment. Thus, when the prediction error is relatively large, certain errors can be tolerated by selecting a smaller size of the sub-array (a wider beam/a smaller resolution) to improve the communication performance in the presence of errors.

In block 606, a sub-codebook corresponding to the size of the activated sub-array is selected from the codebook according to the size of the activated sub-array.

In block 608, a codeword is selected from the sub-codebook according to the first beam angle.

In examples of the present disclosure, the first beam angle may include: a first azimuth angle and a first elevation angle. In this case, selecting a codeword from the sub-codebook according to the first beam angle may include: selecting a codeword from the sub-codebook, wherein a difference between the first azimuth angle and an azimuth angle in a second beam angle corresponding to the codeword selected is minimum; and a difference between the first elevation angle and an elevation angle in the second beam angle corresponding to the codeword selected is minimum. Specifically, the above procedure can be represented by the following expressions.

$$i_k = \arg_{i \in I_n} \min |\alpha_0 - \alpha_i|$$

$$j_k = \arg_{j \in J_m} \min |\beta_0 - \beta_j|$$

Wherein, $(\alpha_0, \beta_0)$ represents the first beam angle; $(\alpha_i, \beta_j)$ indicates the second beam angle corresponding to the codeword $$(i, j); I_n = \left[ 1, \left\lceil \frac{2\pi}{BW_a} \right\rceil \right]$$

is the set of all sequence numbers of the azimuth angle corresponding to the codeword, and $$\mathcal{J}_m = \left[1, \left\lceil \frac{\pi}{BW_e} \right\rceil \right]$$

is the set of all sequence numbers of the elevation angle corresponding to the codeword.

After the codeword is determined, the beam-forming vector can be determined as $v(M_{max}, N_{max}, i_k, j_k, S)$. At the same time, the corresponding activated sub-array can be selected as $S(M_{max}, N_{max}, p_c(i_k))$.

It can be seen that an efficient beam tracking can be achieved by the above method.

Different from the transmitting UAV, the receiving UAV needs to select multiple codewords in order to serve multiple transmitting UAVs. Wherein, each codeword may correspond to one transmitting UAV. Hereinafter, the codeword corresponds to a transmitting UAV is named as the codeword of the transmitting UAV. Thus, there is a need to avoid conflicts when multiple codewords are selected simultaneously.

Figure 7:
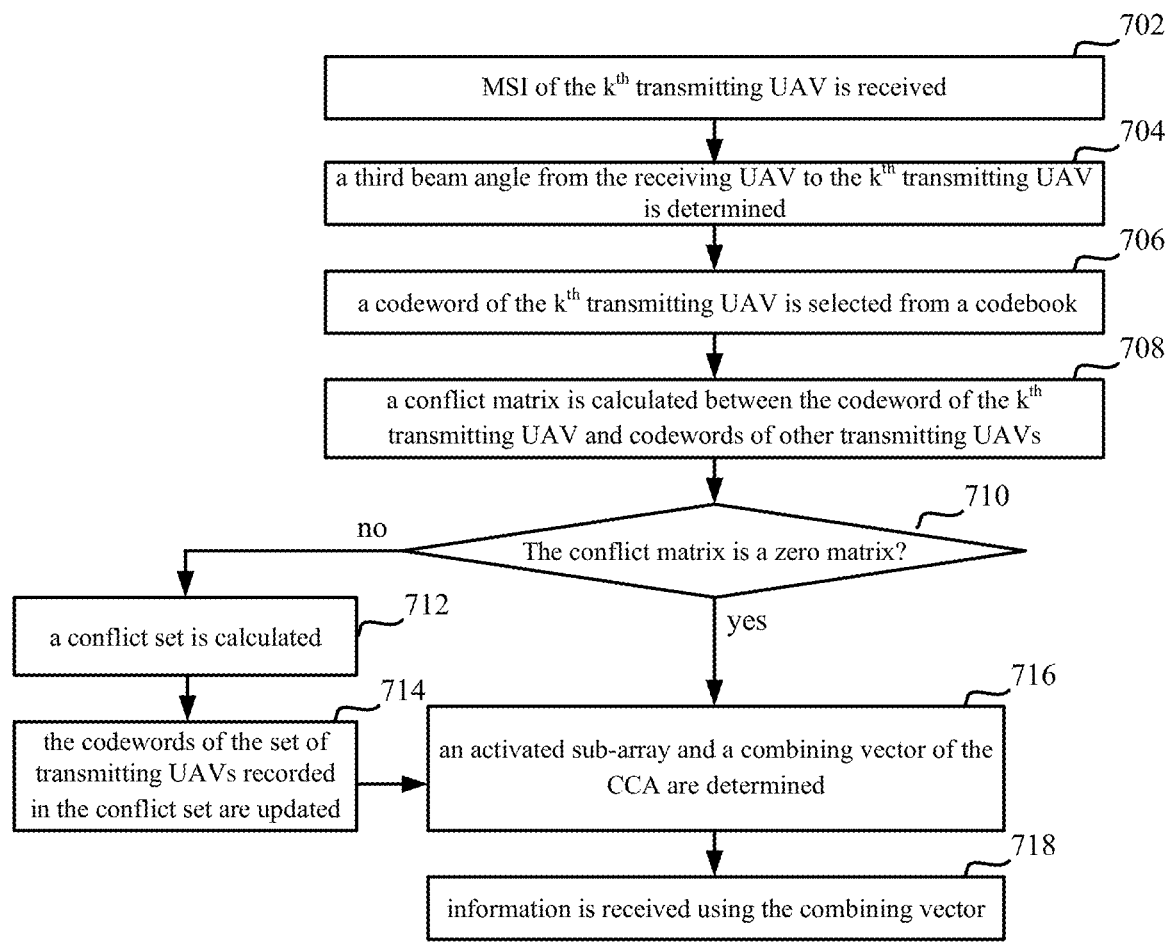
FIG. 7 is a flow chart illustrating a method for beam tracking applied to a receiving UAV according to one or more examples of the present disclosure.

FIG. 7 is a flow chart of a method for beam tracking implemented by a receiving UAV according to an example of the present disclosure.

As shown in FIG. 7, the method may include the following steps.

In block 702, MSI of the $k^{th}$ transmitting UAV fed back by the $k^{th}$ transmitting UAV is received.

In block 704, a third beam angle from the receiving UAV to the $k^{th}$ transmitting UAV is determined according to the MSI of the $k^{th}$ transmitting UAV.

In block 706, a codeword of the $k^{th}$ transmitting UAV is selected from a codebook based on the third beam angle.

In examples of the present disclosure, the codeword is primarily determined by the size of the antenna array of the receiving UAV and the third beam angle (including an azimuth angle and an elevation angle). In particular, the implementation of the above blocks 702-706 may refer to the above blocks 502-506 of FIG. 5 implemented by the transmitting UAV and the codeword selection method shown in FIG. 6.

Furthermore, in examples of the present disclosure, the codeword of the $k^{th}$ transmitting UAV described above may also be referred to as a combining codeword since it will be used for data combining at the receiving UAV.

In block 708, a conflict matrix is calculated between the codeword of the $k^{th}$ transmitting UAV and codewords of other transmitting UAVs.

In examples of the present disclosure, when different combining codewords corresponding to different transmitting UAVs need to activate a same activated sub-array, conflicts will occur between the combining codewords (activated sub-arrays).

Taking the conflict between the codeword of the $k^{th}$ transmitting UAV and the codeword of the $q^{th}$ transmitting UAV as an example, in this case, the following conditions will be satisfied.

$$d(n_{c,k}, n_{c,q}) < \frac{n_{s,k} + n_{s,q}}{2}$$

$$|m_{c,k} - m_{c,q}| < \frac{m_{s,k} + m_{s,q}}{2}$$

Wherein, $(m_{s,k}, n_{s,k})$ represents the size of the activated sub-array corresponding to the codeword of the $k^{th}$ transmitting UAV; $(m_{c,k}, n_{c,k})$ represents the location of the central antenna element corresponding to the codeword of the $k^{th}$ transmitting UAV; $(m_{s,q}, n_{s,q})$ represents the size of the activated sub-array corresponding to the codeword of the $q^{th}$ transmitting UAV; $(m_{c,q}, n_{c,q})$ represents the location of the central antenna element corresponding to the codeword of the $q^{th}$ transmitting UAV; $d(n_{c,k}, n_{c,q})$ represents the distance in the xy-plane between the central antenna elements of the two activated sub-arrays $S_k(m_{s,k}, n_{s,k}, p_{c,k})$ and $S_q(m_{s,q}, n_{s,q}, p_{c,q})$. $d(n_{c,k}, n_{c,q})$ can be determined by the following expression.

$$d(n_{c,k}, n_{c,q}) = \begin{cases} N - |n_{c,k} - n_{c,q}|, & |n_{c,k} - n_{c,q}| > N/2 \\ |n_{c,k} - n_{c,q}|, & \text{else} \end{cases}$$

In order to identify whether there is a conflict between the codewords selected for the transmitting UAVs, in examples of the present disclosure, a conflict matrix is set. The dimension of the conflict matrix equals to the number of the transmitting UAVs. The element in the $k^{th}$ row and the $q^{th}$ column of the conflict matrix is used for recording whether a conflict occurs between the codeword selected for the $k^{th}$ transmitting UAV and the codeword selected for the $q^{th}$ transmitting UAV. For example, when a conflict occurs between the codeword of the $k^{th}$ transmitting UAV and the codeword of the $q^{th}$ transmitting UAV, the element in the $k^{th}$ row and the $q^{th}$ column of the conflict matrix may be set to 1, that is, $C_{sa,(k,q)}=1$; otherwise, the element may be set to 0, that is, $C_{sa,(k,q)}=0$.

Next, the conflict matrix may be updated. In this update process, if $C_{sa,(p,q)}=1$ and $C_{sa,(k,q)}=1$, let $C_{sa,(k,p)}=1$.

In block 710, it is determined whether the conflict matrix is a zero matrix. If it is a zero matrix, proceed to block 716; otherwise, proceed to block 712.

In block 712, a conflict set corresponding to the codeword of the $k^{th}$ transmitting UAV is calculated and the $k^{th}$ transmitting UAV is added to the conflict set.

In the example of the present disclosure, the conflict set is a set of transmitting UAVs for which the codewords have been selected. Wherein, the codewords of the set of transmitting UAVs conflict with the codeword of the $k^{th}$ transmitting UAV. That is, $C_{sa,k} = k \cup \{q | C_{sa,(k,q)}=1\}$. Specifically, the conflict set may record sequence numbers of the set of transmitting UAVs.

In block 714, the codewords of the set of transmitting UAVs recorded in the conflict set are updated.

In examples of the present disclosure, the update process of the codewords in the above block 714 may include: an update of the size of the activated sub-array; an update of the location of the central antenna element; and an update of the combining vector. In examples of the present disclosure, the combining vector may refer to a beam-forming vector of a receiving UAV.

In some examples, the update of the size of the activated sub-array can be realized by the following expression.

$$\begin{cases} N_{act,q} = n_{c,q} \\ M_{act,q} = \left\lfloor \frac{M}{|c_{sa,k}|} \right\rfloor \end{cases}$$

The update of the location of the central antenna element can be realized by the following expression.

$$\begin{cases} n^*_{c,q} = n_{c,q} \\ m^*_{c,q} = \left\lceil \dfrac{(i_q - 1)M_{act,q} + i_q M_{act,q} + 1}{2} \right\rceil \end{cases}$$

The update of the combining vector can be realized element by element by the following expression.

$$[W_q]_{(m,n)} = \begin{cases} [W_q]_{(m,n)}, & m \in [(i_q - 1)M_{act,q} + 1, i_q M_{act,q}] \\ 0, & \text{else} \end{cases}$$

Wherein, $[W_q]_{(m,n)}$ represents the (m, n)-th element of the combining vector $W_q$, $(m_{s,q}, n_{s,q})$ represents the size of the activated sub-array corresponding to the $q^{th}$ transmitting UAV before the update; $(M_{act,q}, N_{act,q})$ represents the size of the activated sub-array corresponding to the $q^{th}$ transmitting UAV after the update; $(m_{c,q}, n_{c,q})$ represents the location of the central antenna element corresponding to the $q^{th}$ transmitting UAV before the update; $(m^*_{c,q}, n^*_{c,q})$ represents the location of the central antenna element corresponding to the $q^{th}$ transmitting UAV after the update; $|C_{sa,k}|$ represents the cardinality of the conflict set; $i_q$ represents a sequence number corresponding to element q in the conflict set arranged in a descending order.

In block 716, an activated sub-array and a combining vector of the CCA are determined according to the size of the activated sub-array corresponding to a sub-codebook to which an updated codeword of the $k^{th}$ transmitting UAV belongs and a fourth beam angle corresponding to the updated codeword of the $k^{th}$ transmitting UAV.

In block 718, information is received using the combining vector.

Specifically, in examples of the present disclosure, after determining the combining vector, the receiving UAV may conduct a beam-forming using the combining vector determined and receive information.

It can be seen that the updated codewords and the activated sub-arrays will no longer conflict with each other.

It can be seen that the methods for beam tracking provided by one or more examples of the present disclosure applies a new codebook which contains both a beam forming pattern and a sub-array activation pattern. The new codebook is applicable to a DRE-covered CCA. Moreover, in the methods for beam tracking based on the new codebook, a transmitting UAV or a receiving UAV can select an appropriate codeword in the new codebook according to MSI of an opposite UAV. Further, an activated sub-array and a beam-forming vector or a combining vector can be determined according to the codeword selected. In this way, the efficiency of millimeter-wave communication between UAVs can be improved.

Compared with other beam tracking schemes, the proposed method can be applied to DRE-covered CCA effectively. Therefore, a full-range beam coverage can be achieved, and the spectrum efficiency of millimeter-wave communications in case of high dynamic UAVs can be improved.

According to the above methods, after exchanging the MSI, a transmitting UAV and a receiving UAV can select a codeword in a pre-set codebook according to the MSI obtained, and then determine an activated sub-array and a beam-forming vector so as to realize data transmission. In other examples of the present disclosure, in order to further improve channel utilizations, instead of exchanging the MSI first in each data transmission time slot, the transmitting UAV and the receiving UAV may exchange the MSI only in one time slot, and predict the MSI of the opposite UAV in a next few time slot according to the MSI obtained. Then the transmitting UAV and the receiving UAV may select a codeword from the codebook according to the MSI predicted. Therefore, channel resources can be saved and channel utilization can be improved. This scheme will be described in detail below.

Figure 8:
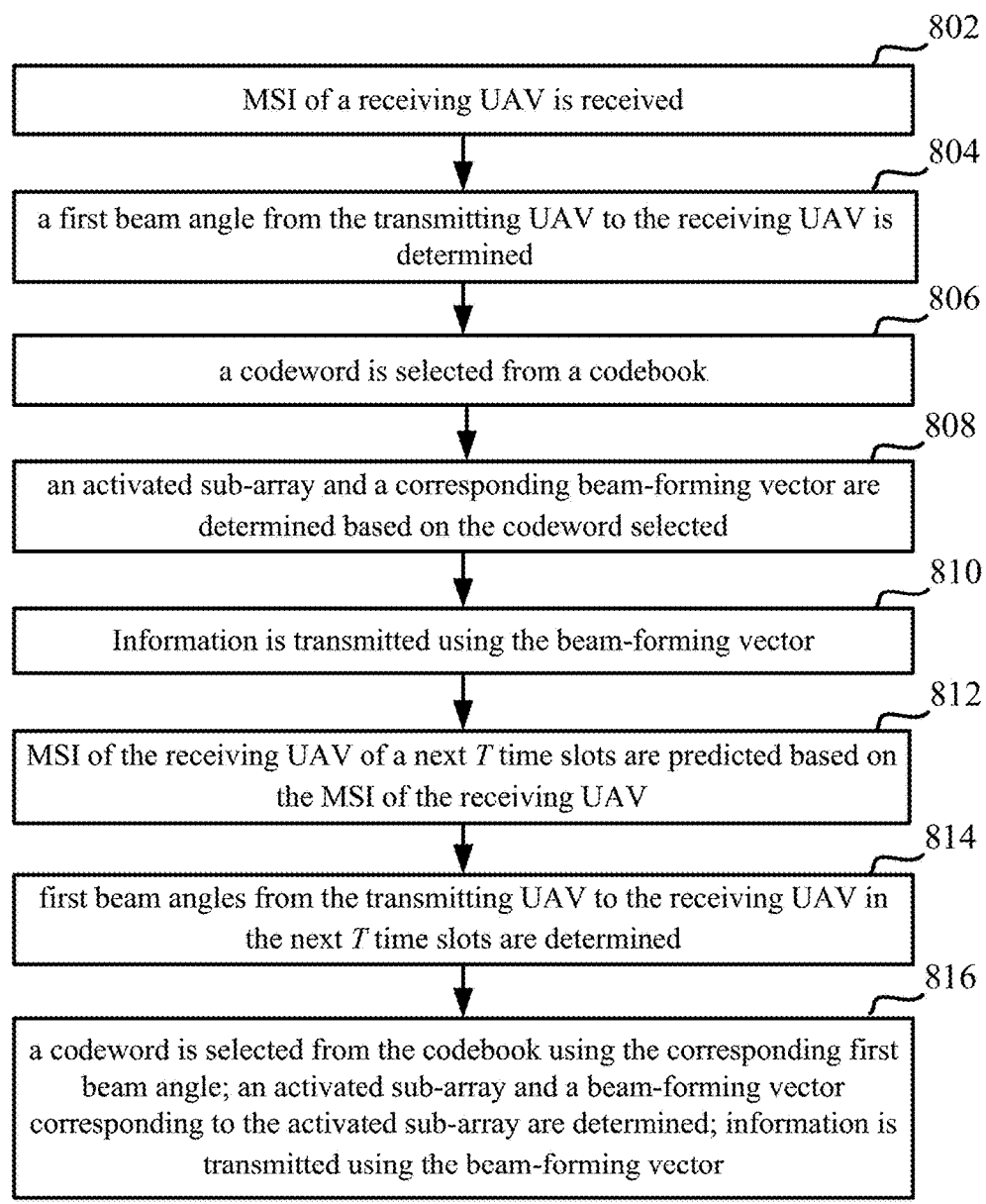
FIG. 8 is a flow chart illustrating a method for beam tracking implemented by a transmitting UAV according to one or more examples of the present disclosure.

FIG. 8 illustrate a method for beam tracking by a transmitting UAV according to an example of the present disclosure. As shown in FIG. 8, the transmitting UAV may perform the following steps to achieve a beam tracking.

In block 802, MSI of a receiving UAV fed back by the receiving UAV is received.

In block 804, a first beam angle from the transmitting UAV to the receiving UAV is determined based on the MSI of the receiving UAV.

In block 806, a codeword is selected from a codebook based on the first beam angle.

In block 808, an activated sub-array and a corresponding beam-forming vector are determined based on the codeword selected.

In block 810, information is transmitted using the beam-forming vector determined.

The implementation of the above blocks 802-810 may refer to the implementation of the above blocks 502-510.

In block 812, MSI of the receiving UAV of a next T time slots are predicted based on the MSI of the receiving UAV.

In an example of the present disclosure, the transmitting UAV can predict the MSI of the receiving UAV via a machine learning method based on a Gaussian process, and calculate a corresponding first beam angle, i.e., an azimuth angle and an elevation angle, according to coordinate frame transformation.

In block 814, first beam angles from the transmitting UAV to the receiving UAV in the next T time slots are determined according to the MSI of the receiving UAV predicted in the next T time slots.

In block 816, in each of the T time slots, a codeword is selected from the codebook using the corresponding first beam angle. Further, an activated sub-array and a beam-forming vector corresponding to the activated sub-array are determined according to the selected codeword, and information is transmitted using the beam-forming vector determined.

In the example of the present disclosure, the method for selecting a codeword from the codebook using the predicted MSI may refer to the method shown in FIG. 6. The method for determining an activated sub-array and a beam-forming vector corresponding to the activated sub-array according to a codeword selected can refer to the implementation of the block 508 in FIG. 5. The method of information transmission using the beam-forming vector determined can refer to the implementation of the block 510 in FIG. 5.

Similar to the transmitting UAV, after performing the step in the above block 702, the receiving UAV may further predict the MSI of the $k^{th}$ transmitting UAV in a next T time slots according to the MSI fed back by the $k^{th}$ transmitting UAV. Then the receiving UAV may determine third beam angles from the receiving UAV to the $k^{th}$ transmitting UAV in the current time slot and the next T time slots respectively. Later on, in each time slot of the T+1 time slots, the receiving UAV will repeatedly perform the above blocks 706-718 to realize the beam tracking in the T+1 time slots.

Figure 9:
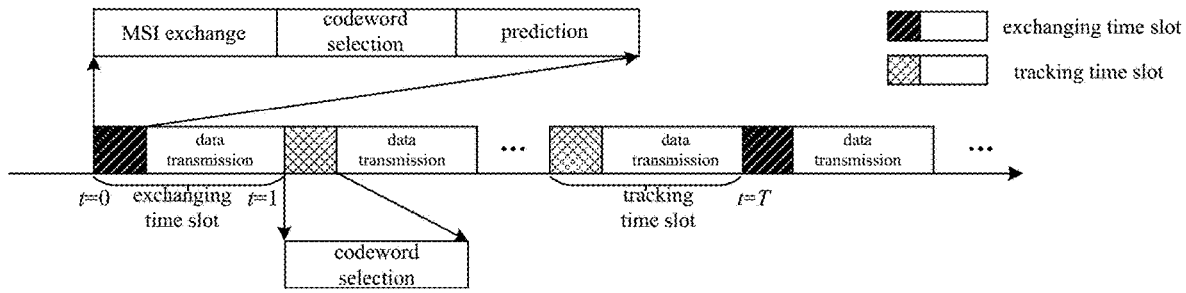
FIG. 9 is a schematic diagram illustrating a frame structure for millimeter-wave beam tracking provided by one or more examples of the present disclosure.

In an example of the present disclosure, the transmitting UAV and the receiving UAV may implement a beam tracking using a time slot structure shown in FIG. 9 based on the beam tracking method described in FIG. 8.

As shown in FIG. 9, the time slot structure may include two kinds of time slots, namely, an exchanging time slot and a tracking time slot. Wherein the exchanging time slot may include an MSI exchanging sub-slot, a codeword selection sub-slot (which may also be referred to as a beam alignment sub-slot), a prediction sub-slot and a data transmission sub-slot. The tracking time slot may include a codeword selection sub-slot and a data transmission sub-slot. Among every two exchanging time slots, there are T tracking time slots. That is, the UAV may perform an MSI exchanging and a location and attitude prediction every T time slots.

Through the MSI exchanging sub-slot in the exchanging time slot, the transmitting UAV can exchange MSI with the receiving UAV. Through the codeword selection sub-slot in the exchanging time slot and in the tracking time slot, the transmitting UAV and the receiving UAV can select a codeword from a codebook according to the exchanged MSI of its opposite UAV or the predicted location and attitude information of its opposite UAV. Through the prediction sub-slot in the exchanging time slot, the transmitting UAV and the receiving UAV can predict the location and attitude information of its opposite UAV. Finally, a beam tracking can be achieved by performing a beam-forming and performing data transmission according to the selected codeword through the data transmission sub-slot in the exchanging time slot and the tracking time slot.

It can be seen that through the time slot structure shown in FIG. 9, a transmitting UAV or a receiving UAV can predict the location and attitude of its opposite UAV based on its MSI. And the transmitting UAV or the receiving UAV may select an appropriate codeword from a codebook according to the predicted location and attitude so as to realize a beam tracking. In examples of the present disclosure, both the transmitting UAV and the receiving UAV may be UAVs equipped with CCAs. In addition, the time slot structure shown in FIG. 9 only needs to exchange the MSI every T+1 time slots, so that the frequency of MSI exchanged between UAVs can be greatly reduced and the communication efficiency can be improved.

Corresponding to the method for beam tracking described above, examples of the present disclosure also provide a device for beam tracking implementing the method for beam tracking described above.

Figure 10:
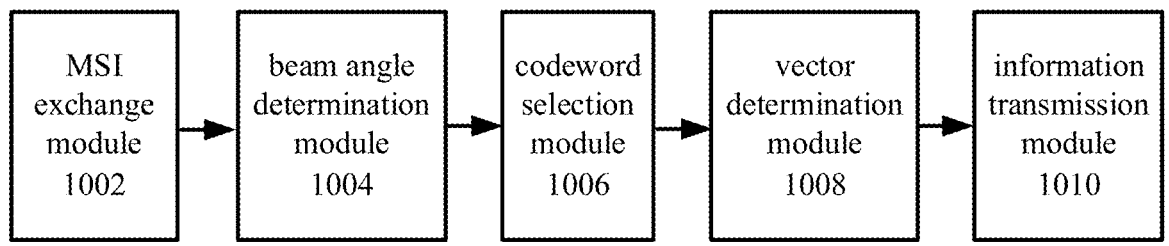
FIG. 10 is a schematic diagram illustrating a structure of a device for beam tracking applied to a transmitting UAV according to one or more examples of the present disclosure.

FIG. 10 shows a structure of a device for beam tracking applied to a transmitting UAV according to an example of the present disclosure. As shown in FIG. 10, the device for beam tracking may include: an MSI exchange module 1002, a beam angle determination module 1004, a codeword selection module 1006, a vector determination module 1008 and an information transmission module 1010.

The MSI exchange module 1002 is configured to receive MSI of a receiving UAV fed back by the receiving UAV.

The determination module 1004 is configured to determine a first beam angle from the transmitting UAV to the receiving UAV according to the MSI of the receiving UAV.

The codeword selection module 1006 is configured to select a codeword from a codebook according to the first beam angle.

Wherein, a size of a maximum activated sub-array corresponding to the codebook is determined according to parameters of a CCA adopted by the transmitting UAV; a number of layers of the codebook is determined according to the size of the maximum activated sub-array; the codebook includes at least two sub-codebooks; each of the sub-codebooks corresponds to a size of an activated sub-array; and the size of the activated sub-array is determined according to the size of the maximum activated sub-array; each of the sub-codebooks includes at least two codewords; each codeword corresponds to a beam angle and a location of a central antenna element of the activated sub-array.

The vector determination module 1008 is configured to determine an activated sub-array and a beam-forming vector of the CCA according to the size of the activated sub-array corresponding to the sub-codebook to which the codeword belongs, a second beam angle and the location of an activated sub-array corresponding to the codeword.

The information transmission module 1010 is configured to transmit information using the beam-forming vector.

Figure 11:
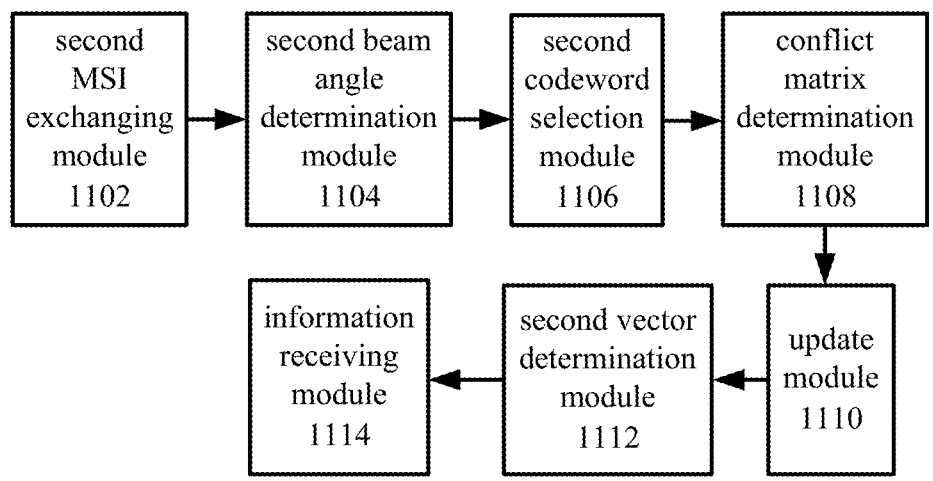
FIG. 11 is a schematic diagram illustrating a structure of a device for beam tracking applied to a receiving UAV according to one or more examples of the present disclosure.

FIG. 11 shows a structure of a device for beam tracking applied to a receiving UAV according to an example of the present disclosure. As shown in FIG. 11, the device for beam tracking may include a second MSI exchanging module 1102, a second beam angle determination module 1104, a second codeword selection module 1106, a conflict matrix determination module 1108, an update module 1110, a second vector determination module 1112, and an information receiving module 1114.

The second MSI exchanging module 1102 is configured to receive MSI of a $k^{th}$ transmitting UAV fed back by the $k^{th}$ transmitting UAV.

The second beam angle determination module 1104 is configured to determine a third beam angle from the receiving UAV to the $k^{th}$ transmitting UAV according to the MSI of the $k^{th}$ transmitting UAV.

The second codeword selection module 1106 is configured to select a codeword from a codebook according to the third beam angle.

Wherein, a size of a maximum activated sub-array corresponding to the codebook is determined according to parameters of a CCA adopted by the receiving UAV. The number of sub-codebooks of the codebook is determined according to the size of the maximum activated sub-array. The codebook includes at least two sub-codebooks. Each of the sub-codebooks corresponds to a size of an activated sub-array; and the size of the activated sub-array is determined according to the size of the maximum activated sub-array. Each of the sub-codebooks includes at least two codewords; each codeword corresponds to a beam angle and a location of a central antenna element of the activated sub-array.

The conflict matrix determination module 1108 is configured to calculate a conflict matrix between a codeword of the $k^{th}$ transmitting UAV and codewords of other transmitting UAVs.

The update module 1110 is configured to calculate a conflict set corresponding to the codeword of the $k^{th}$ transmitting UAV in response to determining that the conflict matrix is a non-zero matrix. Wherein the conflict set is a set of transmitting UAVs and the $k^{th}$ transmitting UAV. The codewords of the set of transmitting UAVs conflict with the codeword of the $k^{th}$ transmitting UAV. The update module 1110 is further configured to update the codewords of the set of transmitting UAVs recorded in the conflict set.

The second vector determination module 1112 is configured to determine an activated sub-array and a combining vector of the CCA according to the size of the activated sub-array corresponding to a sub-codebook to which an updated codeword of the $k^{th}$ transmitting UAV belongs and a fourth beam angle corresponding to the updated codeword of the $k^{th}$ transmitting UAV.

The information receiving module 1114 is configured to receive information using the combining vector.

It should be noted that the implementation of each above module can refer to the beam tracking method described.

It can be seen that the devices for beam tracking provided by one or more examples of the present disclosure applies a new codebook which contains both a beam pattern and a sub-array activation pattern. The new codebook is applicable to a DRE-covered CCA. Moreover, in the methods for beam tracking based on the new codebook, a transmitting UAV or a receiving UAV can select an appropriate codeword in the new codebook according to MSI of an opposite UAV. Further, an activated sub-array and a beam-forming vector or a combining vector can be determined according to the codeword selected. In this way, the efficiency of millimeter-wave communication between UAVs can be improved. Compared with other beam tracking schemes, the proposed method can be applied to DRE-covered CCA effectively. Therefore, a full-range beam coverage can be achieved, and the spectrum efficiency of millimeter-wave communications in case of highly dynamic UAVs can be improved.

The methods of one or more examples of the present disclosure may be performed by a single device, such as a computer or a server. The methods of one or more examples of the present disclosure can also be applied to a distributed scenario, wherein multiple devices cooperate to complete a task. In the case of such a distributed scenario, one device of the plurality of devices may only perform one or more blocks of the method of one or more examples of the present disclosure, and the plurality of devices may interact with each other to perform the described method.

Particular examples of the disclosure have been described above. Other examples are also within the scope of the present disclosure. In some cases, the acts or steps recited in the claims may be executed out of the order of the examples and still achieve desirable results. Additionally, the processes depicted in the accompanying drawings do not necessarily require the particular order shown, or sequential order, to achieve desirable results. Multi-tasking and parallel processing are also possible or may be advantageous in some examples.

For conveniences of description, the above devices are described with functions divided into various modules. Of course, the functionality of each module may be implemented in one or more pieces of software and/or hardware when implementing one or more examples of the present disclosure.

Figure 12:
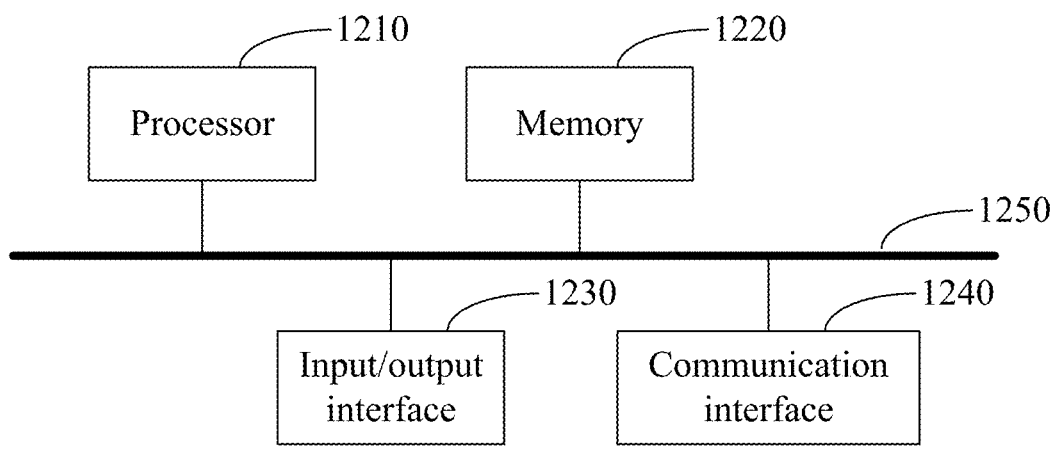
FIG. 12 is a schematic diagram illustrating a hardware structure of a device for beam tracking provided by one or more examples of the present disclosure.

FIG. 12 illustrates a more detailed structural schematic diagram of electronic device hardware provided by the example, the device may comprise a processor 1210, a memory 1220, an input/output (I/O) interface 1230, a communication interface 1240 and a bus 1250. The processor 1210, the memory 1220, the I/O interface 1230 and the communication interface 1240 are in a communication connection with each other within the device via the bus 1250.

The processor 1210 may execute the relevant procedures by virtue of a general central processing unit (CPU), a microprocessor, an application specific integrated circuit (ASIC), or one or more integrated circuits, so as to implement the technical solution provided by the examples of the description.

The memory 1220 may be implemented by a read only memory (ROM), a random-access memory (RAM), a static memory device and a dynamic memory device, etc. The memory 1220 may store an operating system and other application procedures; when the technical solution provided by the example of the Description is implemented via the software or the hardware, the related procedure codes are stored in the memory 1220 and revoked by the processor 1210.

The I/O interface 1230 is used for connecting an I/O unit to realize information input and output. The I/O unit may be configured in the device (not in the figure) as a component configuration, and may be externally connected to the device to provide the corresponding functions. The input device may include keyboard, mouse, touch screen, microphone and various sensors. The output device may include display, loudspeaker, vibrator and indicator lamp.

A communication interface 1240 is used for connecting a communication unit (not shown in the figure) to realize communication interaction between the device and other devices. The communication unit may realize communication in a wired manner (for example, USB, wire, etc.) or in a wireless manner (for example, mobile network, WIFI, Bluetooth, etc.).

The bus 1250 includes a passage which transmits information among various components (for example, the processor 1210, the memory 1220, the I/O interface 1230 and the communication interface 1240) on the device.

It should be noted that, although the above-mentioned device merely shows the processor 1210, the memory 1220, the I/O interface 1230, the communication interface 1240 and the bus 1250, the device may further include other components required by the normal operation in the specific implementation process. Besides, those skilled in the art could appreciate that the above-mentioned device may merely include the components required by the solution in the examples of the Description, but not necessarily include all components shown in the figure.

Figure 13:
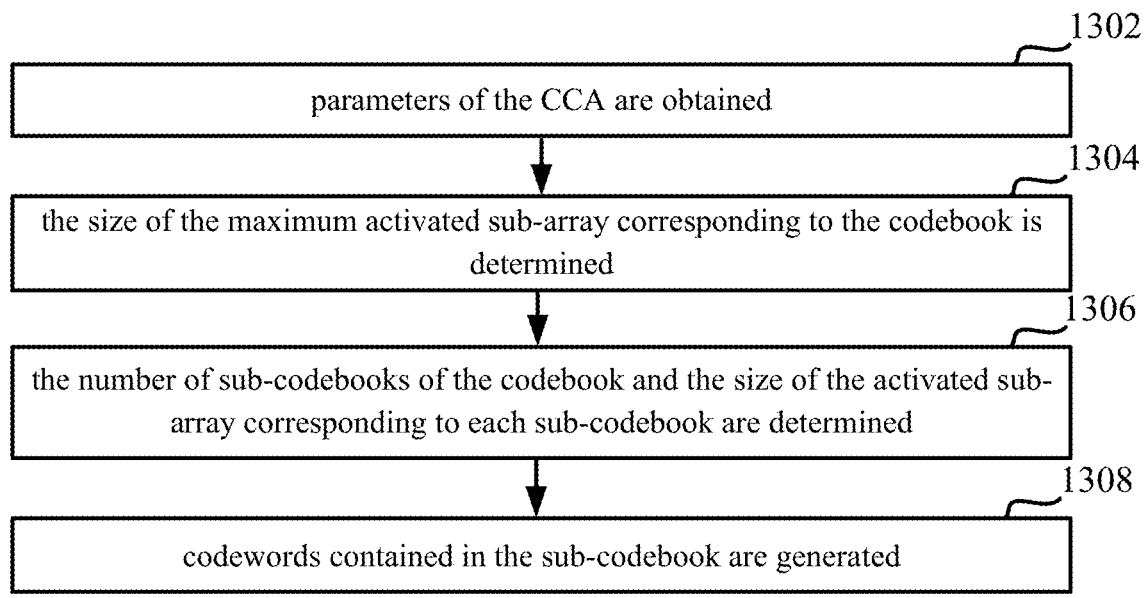
FIG. 13 is a flow chart illustrating a method for generating a codebook according to one or more examples of the present disclosure.

Further, corresponding to the methods and devices for beam tracking described above, examples of the present disclosure also disclose a method for generating a codebook applied to a CCA. FIG. 13 illustrate the procedure of this method. As shown in FIG. 13, the method for generating a codebook may include the following blocks.

In block 1302, parameters of the CCA are obtained.

In examples of the present disclosure, the parameters of the CCA described above may include: the size of the CCA M×N, the distance between antenna elements $$d_{xy} = d_{cyl} = \frac{\lambda_c}{2},$$

the angular interval $$\Delta\phi_c = \frac{2\pi}{N},$$

the radiation width in the azimuth plain $\Delta\alpha$ and the radiation width in the elevation plain $\Delta\beta$.

In block 1304, the size of the maximum activated sub-array corresponding to the codebook is determined according to the parameters of the CCA.

In an example of the present disclosure, assuming that the size of the maximum activated sub-array corresponding to the above codebook is $M_{max} \times N_{max}$, the maximum resolution on the z-axis $M_{max}$ may be set equal to the number of antenna elements on the z-axis. That is, let $M_{max}=M$. The maximum resolution in the xy-plane (circle) $N_{max}$ is determined according to the following expression.

$$N_{max} = \left\| \left\lceil \frac{\alpha_0 + 2l\pi + \Delta\alpha/2}{\Delta\varnothing_c} + \frac{(N+1)}{2} \right\rceil - \left\lceil \frac{\alpha_0 + 2l\pi - \Delta\alpha/2}{\Delta\varnothing_c} + \frac{(N+1)}{2} \right\rceil \right\|$$

Wherein, $\Delta\varnothing_c$ represents an angular interval between antenna elements of the CCA in a xy-plane (a circle). l represents an integer. $\Delta\alpha$ represents a radiation width of the DRE in the azimuth plane. $\alpha_0$ denotes a given azimuth angle.

In block 1036, the number of sub-codebooks of the codebook and the size of the activated sub-array corresponding to each sub-codebook are determined according to the size of the maximum activated sub-array corresponding to the codebook.

In examples of the present disclosure, the number of sub-codebooks is usually greater than 2. The size of the activated sub-array corresponding to each sub-codebook does not equal to one another and is less than or equal to the size of the maximum activated sub-array. The specific number of sub-codebooks and the size of the activated sub-array corresponding to each sub-codebook can be pre-defined according to a setting rule or can be set flexibly according to actual situations of the CCA and the environment. For example, when a prediction error exists, more sub-codebooks and smaller activated sub-array can be set to achieve a higher accuracy.

In block 1038, for each sub-codebook, codewords contained in the sub-codebook are generated according to the size of the corresponding activated sub-array and the parameters of the CCA, wherein each codeword corresponds to a beam angle and a location of a central antenna element in the activated sub-array.

In an example of the present disclosure, taking Sub-codebook t as an example, the size of the activated sub-array corresponding to Sub-codebook t can be set as $M_t \times N_t$.

Then, in the above-mentioned block 1038, the resolution of the Sub-codebook t can be first determined according to the size of the activated sub-array $M_t \times N_t$ corresponding to Sub-codebook t and the parameters of the CCA. Here, the resolution of the Sub-codebook t may refer to a beam width $BW_a$ of the beam in the azimuth plane and the beam width $BW_e$ of the beam in the elevation plane. Then, a quantized azimuth angle and an elevation angle corresponding to each codeword in the sub-codebook are determined according to the beam width $BW_a$ in the azimuth plane and the beam width $BW_e$ in the elevation plane of the beam corresponding to the codeword. Next, the location of the central antenna element of the activated sub-array corresponding to the sub-codebook may be determined according to the size of the activated sub-array corresponding to the sub-codebook, the quantized azimuth angle of each codeword and the parameters of the CCA. Finally, each codeword in the sub-codebook can be generated according to the size of the activated sub-array corresponding to the sub-codebook, the location of the central antenna element of the activated sub-array corresponding to each codeword in the sub-codebook, the quantized azimuth angle and the quantized elevation angle of each codeword in the sub-codebook.

In an example of the present disclosure, the beam width in the azimuth plane $BW_a$ and the beam width in the elevation plane $BW_e$ corresponding to one codeword in the sub-codebook can be determined by the following expressions.

$$BW_a = \min\{BW_{a,array}, BW_{a,element}\}$$

$$BW_e = \min\{BW_{e,array}, BW_{e,element}\}$$

Wherein, $$BW_{a,array} = \frac{2\pi}{N}; BW_{e,array} = \frac{2\pi}{M_t};$$

$BW_{a,element} = \Delta\alpha + (N_t - 1)\Delta\varnothing_c + 2l\pi$, $l \in Z$; $BW_{e,element} = \Delta\beta \cdot \Delta\varnothing_c$ represents an angular interval between antenna elements of the CCA in a xy-plane (a circle). l represents an integer. $\Delta\alpha$ represents a radiation width of the DRE in the azimuth plane. $\Delta\beta$ represents a radiation width of the DRE in the elevation plane. $M_t \times N_t$ represents the size of an activated sub-array corresponding to the sub-codebook.

In an example of the present disclosure, the quantized azimuth angle $\alpha_i$ corresponding to the codeword in row i of the above sub-codebook may be determined by the following expression:

$$\alpha_i = \frac{iBW_a}{2}, i \in \left[1, I = \left\lceil \frac{2\pi}{BW_a} \right\rceil\right]$$

The quantized elevation angle $\beta_j$ corresponding to the codeword in column j of the above sub-codebook may be determined by the following expression:

$$\beta_j = \frac{jBW_e}{2}, j \in \left[1, J = \left\lceil \frac{\pi}{BW_e} \right\rceil\right]$$

In an example of the present disclosure, the location of the central antenna element of the activated sub-array for each codeword can be determined by the following expression:

$$n_c = \left\lceil \frac{\alpha + 2l\pi}{\Delta\varnothing_c} + \frac{(N_t+1)}{2} \right\rceil, l \in Z$$

$$m_c = \left\lfloor \frac{M_t}{2} \right\rfloor$$

Wherein, $\alpha$ represents a given azimuth angle.

In examples of the present disclosure, each codeword may be generated element by element according to the following expressions.

$$[v(M_t, N_t, i, j, S(M_t, N_t, p_c(i))]_{(m_v, n_v)} = 1_{\{m_v, n_v, i, j\}}[A(\alpha_i, \beta_j)]_{(m_v, n_v)}$$

Wherein, $(m_v, n_v)$ represents the indication number of the element of the codeword, and $[v(M_t, N_t, i, j, S)]_{(m_v, n_v)}$ is the $(m_v, n_v)$-th element of the $(i, j)^{th}$ codeword in Sub-codebook $(M_t, N_t)$ $v(M_t, N_t, i, j, S, 1_{\{m_v, n_v, i, j\}}$ represents an indication function, expressed as:

$$1_{\{m_v, n_v, i, j\}} = \begin{cases} 1, & (m_v, n_v) \in S(m, n, p_c(i)) \\ 0, & \text{else} \end{cases}$$

$[A(\alpha_i, \beta_j)]_{(m_v, n_v)}$ is the $(m_v, n_v)$-th entry of $A(\alpha_i, \beta_j)$, and $A(\alpha_i, \beta_j)$ represents a steering vector of the azimuth angle $\alpha_i$ and the elevation angle $\beta_j$. The detailed expression of $A(\alpha_i, \beta_j)$ can refer to the above description.

$S(M_t, N_t, p_c(i))$ is used for determining an activated sub-array. The location of the central antenna element of the activated sub-array is indicated as $p_c(i) = (m_c, n_c)$.

Figure 14:
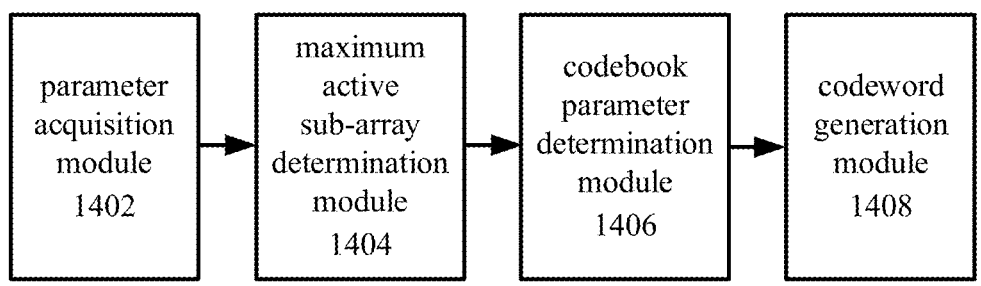
FIG. 14 is a schematic diagram illustrating a structure of a device for generating a codebook according to one or more examples of the present disclosure.

FIG. 14 illustrates a schematic diagram of an internal structure of a device for generating a codebook provided by one or more examples of the present disclosure. As shown in FIG. 14, the device for generating a codebook may include: a parameter acquisition module 1402, a maximum activated sub-array determination module 1404, a codebook parameter determination module 1406, and a codeword generation module 1408.

The parameter acquisition module 1402 is configured to acquire parameters of the CCA.

The maximum activated sub-array determination module 1404 is configured to determine a size of a maximum activated sub-array corresponding to the codebook according to the parameters of the CCA.

The codebook parameter determination module 1406 is configured to determine the number of sub-codebooks contained in the codebook and the size of an activated sub-array corresponding to each sub-codebook according to the size of the maximum activated sub-array corresponding to the codebook.

The codeword generation module 1408 is configured to generate codewords contained in each sub-codebook according to the size of a corresponding activated sub-array and the parameters of the CCA.

Wherein, the parameters of the CCA may include: the size of the CCA, the distance between antenna elements, the angular interval and the directional radiation width of the antenna elements.

The implementation of the maximum activated sub-array determination module 1404, the codebook parameter determination module 1406 and codeword generation module 1408 can refer to the above-mentioned codebook generation method, which will not be described in detail herein.

Furthermore, a person skilled in the art would understand that the above-mentioned device for generating codebook can also be implemented using the hardware structure shown in FIG. 12. In an application, a memory may store computer instructions corresponding to the above-mentioned various modules, and a processor may execute the above-mentioned computer instructions to implement the above-mentioned codebook generation method.

The codebook generated by the above-mentioned method or device for generating a codebook is a hierarchical codebook. The codebook contains information about a beam forming pattern (an azimuth beam angle, an elevation beam angle and beam width) and an sub-array activation pattern (the size of an activated sub-array and the location of the central antenna element of the activated sub-array) at the same time. Therefore, a full-space coverage with different resolutions (beam widths) can be achieved. The codebook provides a basis for obtaining a beam-forming vector and an activated sub-array of a CCA quickly. It is suitable for the beam tracking of the highly dynamic UAV network.

Based on the same inventive concept, corresponding to the methods according to any one of the foregoing examples, the present disclosure further provides a non-transient computer readable storage medium which stores a computer instruction used for enabling the computer to perform the method for beam tracking and the method for generating a codebook according to any one of the examples.

The computer readable medium in the example includes volatile, non-volatile, movable and non-movable media, which can realize information storage by any method or technology. The information can be computer readable instruction, data structure, program unit or other data. The example of computer storage media includes, but not limited to phase-change memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g. circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A method for beam tracking implemented by a transmitting unmanned aerial vehicle (UAV), comprising:
receiving motion state information (MSI) of a receiving UAV;
determining a first beam angle from the transmitting UAV to the receiving UAV according to the MSI of the receiving UAV;
selecting a codeword from a codebook according to the first beam angle; wherein, a size of a maximum activated sub-array corresponding to the codebook is determined according to parameters of a directional radiating element (DRE)-covered cylindrical conformal antenna (CCA) adopted by the transmitting UAV; the codebook includes at least two sub-codebooks; a number of sub-codebooks of the codebook is determined according to the size of the maximum activated sub-array; each of the sub-codebooks corresponds to a size of an activated sub-array; the size of the activated sub-array is determined according to the size of the maximum activated sub-array; each of the sub-codebooks includes at least two codewords; each codeword corresponds to a beam angle and a location of a central antenna element of the activated sub-array;

determining an activated sub-array and a beam-forming vector of the CCA according to a size of an activated sub-array corresponding to a sub-codebook to which the codeword belongs, a second beam angle corresponding to the codeword selected and a location of a central antenna element of an activated sub-array corresponding to the codeword selected; and transmitting information using the beam-forming vector.

2. The method of claim 1, wherein determining a first beam angle from the transmitting UAV to the receiving UAV comprises:

determining the first beam angle in a current time slot according to the MSI of the receiving UAV;

predicting MSI of the receiving UAV in each of a next T time slots according to the MSI of the receiving UAV; and determining the first beam angle from the transmitting UAV to the receiving UAV corresponding to each of the next T time slots according to the MSI of the receiving UAV predicted.

3. The method of claim 2, wherein the MSI of the receiving UAV comprises: location information and attitude information of the receiving UAV;

wherein determining a first beam angle comprises: determining the first beam angle from the transmitting UAV to the receiving UAV according to the location information and the attitude information of the receiving UAV based on a geometric relationship between the transmitting UAV and the receiving UAV.

4. The method of claim 1, wherein selecting a codeword from a codebook according to the first beam angle comprises:

determining a size of an activated sub-array according to a size of the CCA and the first beam angle; wherein the size of the activated sub-array is a maximum resolution calculated based on the size of the CCA and the first beam angle;

selecting a sub-codebook corresponding to the size of the activated sub-array; and selecting a codeword from the sub-codebook according to the first beam angle.

5. The method of claim 4, wherein the maximum resolution $M_{max} \times N_{max}$ is calculated according to the following expressions:

$$M_{max} = M$$
$$N_{max} = \left\| \left\lfloor \frac{\alpha_0 + 2l\pi + \Delta\alpha/2}{\Delta\emptyset_c} + \frac{(N+1)}{2} \right\rfloor - \left\lceil \frac{\alpha_0 + 2l\pi - \Delta\alpha/2}{\Delta\emptyset_c} + \frac{(N+1)}{2} \right\rceil \right\|$$

wherein $M_{max}$ represents a maximum resolution on a z-axis of the CCA; $N_{max}$ represents a maximum resolution in an xy-plane of the CCA; M represents a number of antenna elements on the z-axis of the CCA; N represents a number of antenna elements in the xy-plane of the CCA; $\Delta\emptyset_c$ represents an angular interval between antenna elements in the xy-plane of the CCA; l represents an integer; $\Delta\alpha$ represents a radiation width of the DRE in an azimuth plane; $\alpha_0$ represents a given azimuth angle.

6. The method of claim 4, wherein the first beam angle comprises: a first azimuth angle and a first elevation angle;

wherein selecting a codeword from a codebook according to the first beam angle comprises: selecting the codeword from the sub-codebook, wherein a difference between the first azimuth angle and a second azimuth angle in the second beam angle corresponding to the codeword is minimum; and a difference between the first elevation angle and a second elevation angle in the second beam angle corresponding to the codeword is minimum.

7. The method of claim 4, wherein determining an activated sub-array and a beam-forming vector of the CCA comprises:

determining a location of a central antenna element of an activated sub-array according to the size of the CCA and the second beam angle;

determining the activated sub-array according to the size of the activated sub-array and the location of the central antenna element of the activated sub-array;

determining a steering vector according to the second beam angle corresponding to the codeword; and determining the beam-forming vector according to the activated sub-array and the steering vector.

8. A method for beam tracking implemented by a receiving unmanned aerial vehicle (UAV), comprising:

receiving motion state information (MSI) of a $k^{th}$ transmitting UAV;

determining a third beam angle from the receiving UAV to the $k^{th}$ transmitting UAV according to the MSI of the $k^{th}$ transmitting UAV;

selecting a codeword of the $k^{th}$ transmitting UAV from a codebook according to the third beam angle; wherein, a size of a maximum activated sub-array corresponding to the codebook is determined according to parameters of a cylindrical conformal antenna (CCA) adopted by the receiving UAV; the codebook includes at least two sub-codebooks; a number of sub-codebooks of the codebook is determined according to the size of the maximum activated sub-array; each of the sub-codebooks corresponds to a size of an activated sub-array; the size of the activated sub-array is determined according to the size of the maximum activated sub-array; each of the sub-codebooks includes at least two codewords;

each codeword corresponds to a beam angle and a location of a central antenna element of the activated sub-array;

calculating a conflict matrix between the codeword of the kth transmitting UAV and codewords of other transmitting UAVs;

in response to determining the conflict matrix is a non-zero matrix, calculating a conflict set corresponding to the codeword of the $k^{th}$ transmitting UAV; the conflict set includes a set of transmitting UAVs for which codewords have been selected; wherein, codewords of the set of transmitting UAVs conflict with the codeword of the $k^{th}$ transmitting UAV;

adding the $k^{th}$ transmitting UAV into the conflict set;

updating the codewords of the transmitting UAVs in the conflict set;

determining an activated sub-array and a combining vector of the CCA according to a size of an activated sub-array corresponding to a sub-codebook to which an updated codeword of the $k^{th}$ transmitting UAV belongs, a fourth beam angle corresponding to the updated codeword of the $k^{th}$ transmitting UAV; and receiving information using the combining vector;

in response to determining the conflict matrix is a zero matrix, receiving information using the combining vector.

9. The method of claim 8, wherein determining a third beam angle from the receiving UAV to the $k^{th}$ transmitting UAV according to the MSI of the $k^{th}$ transmitting UAV comprises:

determining the third beam angle from the receiving UAV to the $k^{th}$ transmitting UAV in a current time slot according to the MSI of the $k^{th}$ transmitting UAV;

predicting MSI of the $k^{th}$ transmitting UAV in each of a next T time slot according to the MSI of the $k^{th}$ transmitting UAV; and determining the third beam angle from the receiving UAV to the $k^{th}$ transmitting UAV corresponding to each of the next T time slots according to the MSI of the $k^{th}$ transmitting UAV predicted.

10. The method of claim 8, wherein updating the codewords of the transmitting UAVs in the conflict set comprises:

updating a size of an activated sub-array corresponding to each codeword by:

$$\begin{cases} N_{act,q} = n_{s,q} \\ M_{act,q} = \left\lfloor \dfrac{M}{|c_{sa,k}|} \right\rfloor \end{cases}$$

updating a location of a central antenna element corresponding to each codeword by:

$$\begin{cases} n^*_{c,q} = n_{c,q} \\ m^*_{c,q} = \left\lceil \dfrac{(i_q - 1)M_{act,q} + i_q M_{act,q} + 1}{2} \right\rceil \end{cases}$$

updating a combining vector corresponding to each codeword entry by entry by:

$$[W_q]_{(m,n)} = \begin{cases} [W_q]_{(m,n)}, & m \in [(i_q - 1)M_{act,q} + 1, i_q M_{act,q}] \\ 0, & \text{else} \end{cases}$$

wherein $[W_q]_{(m,n)}$ represents the (m, n)-th element of the combining vector $W_q$, $(M_{act,q}, N_{act,q})$ represents the size of the activated sub-array corresponding to the $q^{th}$ transmitting UAV after the update; $(m^*_{c,q}, n^*_{c,q})$ represents the location of the central antenna element corresponding to the $q^{th}$ transmitting UAV after the update; $|C_{sa,k}|$ represents a cardinality of the conflict set; $i_q$ represents a sequence number corresponding to element q in the conflict set arranged in a descending order.

11. A method for generating a codebook applied to a cylindrical conformal antenna (CCA), comprising:

obtaining parameters of the CCA;

determining a size of a maximum activated sub-array corresponding to the codebook according to the parameters of the CCA;

determining a number of sub-codebooks contained in the codebook and a size of an activated sub-array corresponding to each sub-codebook according to the size of the maximum activated sub-array corresponding to the codebook; and for each sub-codebook, generating codewords contained in the sub-codebook according to the size of the activated sub-array corresponding to the sub-codebook and the parameters of the CCA; wherein, each codeword corresponds to a beam angle and a location of a central antenna element in the activated sub-array.

12. The method of claim 11, wherein the parameters of the CCA comprise: a size of the CCA M×N, a distance between two adjacent antenna elements $$d_{xy} = d_{cyl} = \dfrac{\lambda_c}{2},$$

an angular interval $$\Delta \phi_c = \dfrac{2\pi}{N},$$

a radiation width in an azimuth plain $\Delta\alpha$ and a radiation width in an elevation plain $\Delta\beta$.

13. The method of claim 12, wherein determining a size of a maximum activated sub-array comprises: determining the size of the maximum activated sub-array corresponding to the codebook as $M_{max} \times N_{max}$, wherein $$M_{max} = M$$
$$N_{max} = \left\| \left\lceil \dfrac{\alpha_0 + 2l\pi + \Delta\alpha/2}{\Delta\phi_c} + \dfrac{(N+1)}{2} \right\rceil - \left\lceil \dfrac{\alpha_0 + 2l\pi - \Delta\alpha/2}{\Delta\phi_c} + \dfrac{(N+1)}{2} \right\rceil \right\|$$

$M_{max}$ represents a maximum resolution on a z-axis of the CCA; $N_{max}$ represents a maximum resolution in an xy-plane of the CCA; M represents a number of antenna elements on the z-axis of the CCA; N represents a number of antenna elements in the xy-plane of the CCA; $\Delta\phi_c$ represents an angular interval between antenna elements in the xy-plane of the CCA; l represents an integer; $\Delta\alpha$ represents a radiation width of the DRE in an azimuth plane; $\alpha_0$ represents a given azimuth angle.

14. The method of claim 11, wherein determining a size of an activated sub-array corresponding to each sub-codebook comprises: determining the size of the activated sub-array corresponding to each sub-codebook smaller than the size of the maximum activated sub-array corresponding to the codebook; wherein the sizes of the activated sub-arrays corresponding to different sub-codebooks are different.

15. The method of claim 11, wherein generating codewords contained in the sub-codebook comprises:

determining a beam width in an azimuth plane and a beam width in an elevation plane corresponding to each codeword in the sub-codebook according to the size of the activated sub-array corresponding to the sub-codebook and the parameters of the CCA;

determining an azimuth angle and an elevation angle of each codeword in the sub-codebook according to the beam width in the azimuth plane and the beam width in the elevation plane corresponding to each codeword in the sub-codebook;

determining a location of a central antenna element of the activated sub-array corresponding to each codeword of the sub-codebook according to the size of the activated sub-array corresponding to the sub-codebook, the azimuth angle and the parameters of the CCA; and generating each codeword in the sub-codebook according to the size of the activated sub-array corresponding to the sub-codebook, the location of the central antenna element of the activated sub-array corresponding to each codeword in the sub-codebook, and the azimuth angle and the elevation angle of each codeword in the sub-codebook.

16. The method of claim 15, wherein the beam width in the azimuth plane $BW_a$ corresponding to one codeword in the sub-codebook is determined by:

$$BW_a = \min\{BW_{a,array}, BW_{a,element}\}$$

the beam width in the elevation plane $BW_e$ corresponding to one codeword in the sub-codebook is determined by:

$$BW_e = \min\{BW_{e,array}, BW_{e,element}\}$$

wherein $$BW_{a,array} = \frac{2\pi}{N_t}; \; BW_{e,array} = \frac{2\pi}{M_t};$$

$BW_{a,element} = \Delta\alpha + (N_t-1)\Delta\varnothing_c + 2l\pi$, $1 \in Z$; $BW_{e,element} = \Delta\beta$; $\Delta\varnothing_c$ represents an angular interval between antenna elements of the CCA in a xy-plane; l represents an integer; $\Delta\alpha$ represents a radiation width of the DRE in the azimuth plane. $\Delta\beta$ represents a radiation width of the DRE in the elevation plane; and $M_t \times N_t$ represents the size of an activated sub-array corresponding to the sub-codebook.

17. The method of claim 15, wherein the azimuth angle $\alpha_i$ corresponding to the codeword in row i of the sub-codebook is determined by:

$$\alpha_i = \frac{iBW_a}{2}, i \in \left[1, \left\lceil \frac{2\pi}{BW_a} \right\rceil\right]$$

the elevation angle $\beta_j$ corresponding to the codeword in column j of the sub-codebook is determined by:

$$\beta_j = \frac{jBW_e}{2}, j \in \left[1, \left\lceil \frac{\pi}{BW_e} \right\rceil\right].$$

18. The method of claim 15, wherein the location of the central antenna element of the activated sub-array for each codeword is determined by:

$$n_c = \left\lceil \frac{\alpha + 2l\pi}{\Delta\varnothing_c} + \frac{(N_t+1)}{2} \right\rceil, l \in Z$$

$$m_c = \left\lfloor \frac{M_t}{2} \right\rfloor$$

wherein $\alpha$ represents a given azimuth angle.

19. The method of claim 13, wherein generating each codeword in the sub-codebook comprises: generating each codeword element by element according to the following expressions:

$$[v(M_t, N_t, i, j, S)]_{(m_v, n_v)} = 1_{\{m_v, n_v, i, j\}} [A(\alpha_i, \beta_j)]_{(m_v, n_v)}$$

wherein $(m_v, n_v)$ represents the indication number of the element of the codeword, and $[v(M_t, N_t, i, j, S)]_{(m_v, n_v)}$ is the $(m_v, n_v)$-th element of the $(i, j)^{th}$ codeword in Sub-codebook (m, n) $v(M_t, N_t, i, j, S)$, $1_{\{m_v, n_v, i, j\}}$ represents an indication function, expressed as:

$$1_{\{m_v, n_v, i, j\}} = \begin{cases} 1, & (m_v, n_v) \in S(m, n, p_c(i)) \\ 0, & \text{else} \end{cases}$$

$[A(\alpha_i, \beta_j)]_{(m_v, n_v)}$ is the $(m_v, n_n)$-th entry of $A(\alpha_i, \beta_j)$, and $A(\alpha_i, \beta_j)$ represents a steering vector of the azimuth angle $\alpha_i$ and the elevation angle $\beta_j$; $S(M_t, N_t, p_c(i))$ is used for determining an activated sub-array; the location of the central antenna element of the activated sub-array is indicated as $p_c(i) = (m_c, n_c)$.

* * * * *